US011539642B2

(12) United States Patent
Johansson et al.

(10) Patent No.: US 11,539,642 B2
(45) Date of Patent: Dec. 27, 2022

(54) FALLBACK COMMAND IN A MODULAR CONTROL SYSTEM

(71) Applicant: Axis AB, Lund (SE)

(72) Inventors: Marcus Johansson, Lund (SE); Jon Malmquist, Lund (SE); Emil Selinder, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/731,913

(22) Filed: Dec. 31, 2019

(65) Prior Publication Data
US 2021/0203617 A1    Jul. 1, 2021

(51) Int. Cl.
*H04L 47/70* (2022.01)
*H04L 47/783* (2022.01)
*H04L 47/78* (2022.01)

(52) U.S. Cl.
CPC .......... *H04L 47/828* (2013.01); *H04L 47/783* (2013.01); *H04L 47/788* (2013.01); *H04L 47/821* (2013.01); *H04L 47/827* (2013.01)

(58) Field of Classification Search
CPC ... H04L 47/828; H04L 47/783; H04L 47/788; H04L 47/821; H04L 47/827
See application file for complete search history.

(56) References Cited

U.S. PATENT DOCUMENTS

| 5,535,326 | A | * | 7/1996 | Baskey | ............... | G06F 11/2025 |
| | | | | | | 370/248 |
| 5,537,642 | A | * | 7/1996 | Glowny | ................ | G06F 11/201 |
| | | | | | | 380/28 |
| 5,745,694 | A | | 4/1998 | Egawa et al. | | |
| 10,178,638 | B1 | * | 1/2019 | Stamatakis | ........ | G06Q 10/1097 |
| 2001/0032256 | A1 | | 10/2001 | Sondur et al. | | |
| 2004/0003078 | A1 | | 1/2004 | Todd et al. | | |
| 2005/0278441 | A1 | | 12/2005 | Bond et al. | | |
| 2009/0234934 | A1 | | 9/2009 | Ong | | |
| 2014/0245451 | A1 | | 8/2014 | Le Sant | | |

(Continued)

OTHER PUBLICATIONS

Wikipedia: Dependency injection. Accessed online Sep. 30, 2020; http://web.archive.org/web/20190604055736/en.wikipedia.org/wiki/Dependency_injection; 17 pages.

(Continued)

*Primary Examiner* — Jonathan A Bui
*Assistant Examiner* — Zonghua Du
(74) *Attorney, Agent, or Firm* — Snyder, Clark, Lesch & Chung, LLP

(57) ABSTRACT

A device may include a memory storing instructions and a processor configured to execute the instructions to receive an instruction from an administration device; identify a link selector in the instruction that corresponds to a resource attribute of a first resource that specifies how a second resource is to be controlled by the first resource; query a database of contracts between resources to determine that the second resource is available to be controlled by the first resource, based on resource contracts associated with the second resource. The processor may be further configured to generate a resource contract between the first resource and the second resource that indicates the second resource is controlled by the first resource and enable the first resource to communicate with the second resource in accordance with the generated resource contract.

20 Claims, 17 Drawing Sheets

(56) References Cited

U.S. PATENT DOCUMENTS

| | | | |
|---|---|---|---|
| 2015/0355613 A1* | 12/2015 | Palmer | H04L 12/2816 |
| | | | 700/275 |
| 2016/0234186 A1 | 8/2016 | Leblond et al. | |
| 2017/0031955 A1 | 2/2017 | Kenchammana-Hosekote et al. | |
| 2018/0042064 A1* | 2/2018 | Norton | H04W 4/06 |
| 2018/0136979 A1 | 5/2018 | Morris | |
| 2018/0202675 A1* | 7/2018 | Park | F24F 11/62 |
| 2018/0302861 A1* | 10/2018 | Zhao | H04W 52/0267 |
| 2019/0042508 A1* | 2/2019 | Raghav | G06F 9/30141 |
| 2020/0099576 A1* | 3/2020 | Olsen | H04L 41/065 |

OTHER PUBLICATIONS

Wikipedia: XenApp. Accessed online Sep. 30, 2020; http://web.archive.org/web/20190403155533/en.wikipedia.org/wiki/XenApp; 3 pages.

Wikipedia: X Window System. Accessed online Sep. 30, 2020; http://web.archive.org/web/20190603111122/en.wikipedia.org/wiki/X_Window_System; 22 pages.

\* cited by examiner

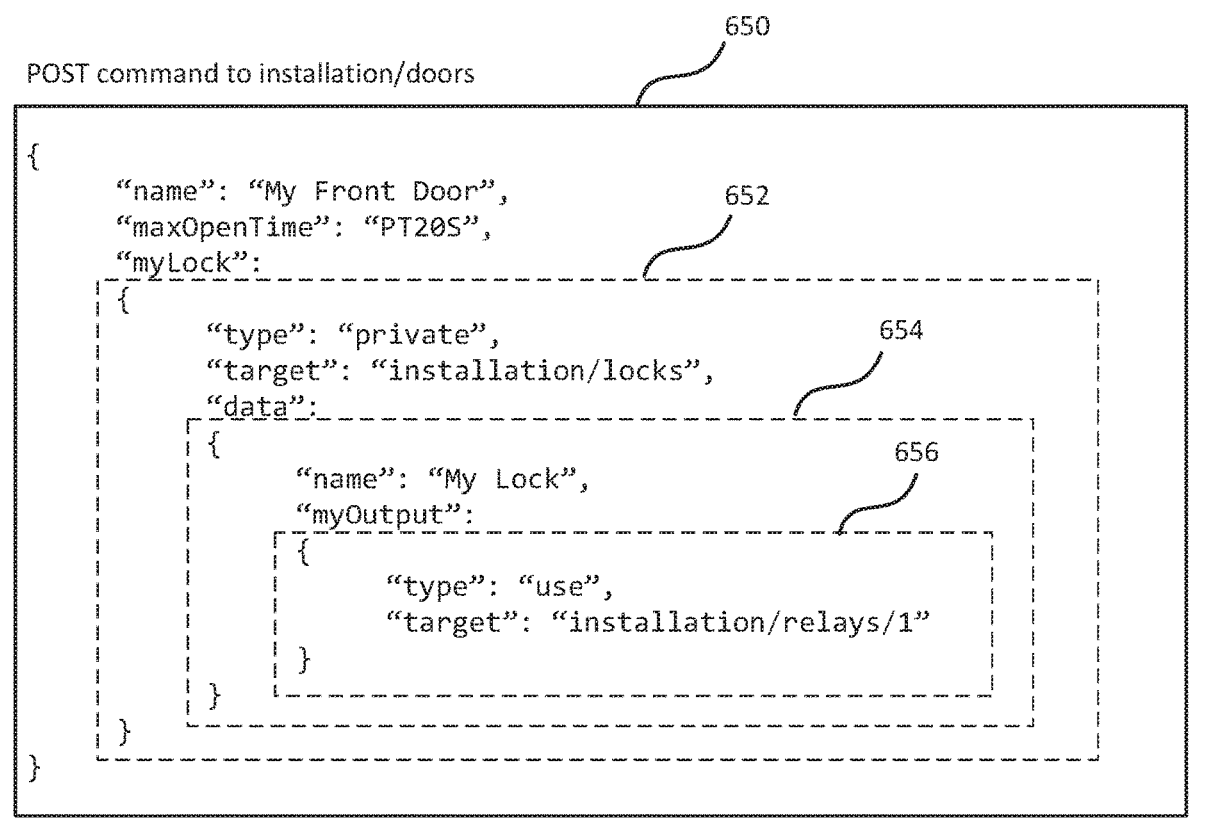

POST command to installation/doors

```
{
    "name": "My Front Door",
    "maxOpenTime": "PT20S",
    "myLock":
    {
        "type": "private",
        "target": "installation/locks",
        "data":
        {
            "name": "My Lock",
            "myOutput":
            {
                "type": "use",
                "target": "installation/relays/1"
            }
        }
    }
}
```

FIG. 6C

```
{
    "messageType": "request",
    "request": {
        "requestType": "command",
        "target": {
            "href": "portal/doors/1"
        },
        "interface": "portal-op",
        "command": {
            "fallback": true,
            "name": "makeSecure"
        }
    }
}
```
902

FALLBACK COMMAND IN A MODULAR CONTROL SYSTEM

FIELD

This disclosure generally relates to access control systems, and more specifically, to a fallback command in a modular access control system.

BACKGROUND INFORMATION

A modular control system may include components that communicate and coordinate their actions to achieve a set of tasks. For example, a controller device may control multiple peripheral devices that communicate with the controller or with each other. Managing multiple devices in a modular control system may pose various challenges.

SUMMARY

A method, performed by a computer device, may include receiving a request to define a resource, wherein the resource enables access to a domain object handler that corresponds to a logical entity that controls a device or a port, or corresponds to a logical entity that controls a downstream resource. The method may include identifying a domain object for the resource in a domain object database. The domain object may map the resource to the domain object handler for the computer device. The method may include identifying an interface for the resource. The interface may specify one or more commands associated with the resource. The interface may be configured to receive the one or more commands through an upstream link from a client. The method may include receiving a fallback command associated with the interface for the resource. The domain object handler may be configured to execute the fallback command when determined that the upstream link associated with the interface is in a failed state. The method may include storing the fallback command in the domain object for the resource associated with the interface. The method may include processing, by the domain object handler of the computer device, commands received through the interface for the resource.

The method, performed by the computer device, may include determining that the upstream link associated with the interface is in the failed state, and executing, by the domain object handler, the fallback command.

Determining that the upstream link associated with the interface is in the failed state may include determining that a process associated with the upstream link is not running. Determining that the upstream link associated with the interface is in the failed state may include determining that a communication channel associated with the upstream link is not receiving data.

The method, performed by the computer device, may include interpreting, by the domain object handler, the fallback command and generating a downstream fallback command that corresponds to carrying out the semantic interpretation of the fallback command. A downstream domain object handler may be configured to execute the downstream fallback command when determined that the downstream link to an interface associated with the downstream resource is in a failed state.

The method, performed by the computer device, may include sending the downstream fallback command associated with the interface for the resource. The domain object handler may be configured to execute the fallback command when determined that the upstream link to the interface associated with the resource is in the failed state.

The method, performed by the computer device, may include receiving a request to define a downstream resource. The downstream resource may enable access to a downstream domain object handler that corresponds to a logical entity that controls a device or a port, or corresponds to a logical entity that controls another downstream resource. The method may include identifying a downstream domain object for the downstream resource in the domain object database. The downstream domain object may map the downstream resource to the downstream domain handler for the computer device. The method may include identifying the downstream interface for the downstream resource. The interface may specify one or more commands associated with the downstream resource. The downstream interface may be configured to receive the one or more commands through an upstream link from a client.

The method, performed by the computer device, may include receiving a fallback command associated with the interface for the downstream resource. The downstream domain object handler may be configured to execute the fallback command when determined that the upstream link associated with the interface is in the failed state. The method may include storing the fallback command in the domain object associated with the downstream interface for the downstream resource. The method may include processing, by the domain object handler of the computer device, commands received by the resource based on the information stored in the resource record.

The method, performed by the computer device, may include determining that the downstream link associated with the interface is in the failed state, and executing, by the downstream domain object handler, the downstream fallback command.

The method, performed by the computer device, may include interpreting, by the downstream domain object handler, the fallback command and generating a second downstream fallback command that corresponds to carrying out the semantic interpretation of the fallback command. A second downstream domain object handler may be configured to execute the downstream fallback command when determined that a second downstream link to an interface associated with the second downstream resource is in a failed state.

A device may include a memory to store instructions and a processor configured to execute the instructions. The processor may be configured to receive a request to define a resource. The resource may enable access to a domain object handler that corresponds to a logical entity that controls a device or a port, or corresponds to a logical entity that controls a downstream resource. The processor may be configured to identify a domain object for the resource in a domain object database. The domain object maps the resource to the domain object handler for the computer device. The processor may be configured to identify an interface for the resource. The interface may specify one or more commands associated with the resource and the interface may be configured to receive the one or more commands through an upstream link from a client. The processor may be configured to receive a fallback command associated with the interface for the resource. The domain object handler may be configured to execute the fallback command when determined that the upstream link associated with the interface is in a failed state. The processor may be configured to store the fallback command in the domain object for the resource associated with the interface, and process, by the domain object handler commands received through the interface for the resource.

The processor may be configured to determine that the upstream link associated with the interface is in the failed state, and execute, by the domain object handler, the fallback command.

When the processor determines that the upstream link associated with the interface is in the failed state, the processor may be configured to determine that a process associated with the upstream link is not running. When the processor determines that the upstream link associated with the interface is in the failed state, the processor may be configured to determine that a communication channel associated with the upstream link is not receiving data.

The processor may be configured to interpret, by the domain object handler, the fallback command and generate a downstream fallback command that corresponds to carrying out the semantic interpretation of the fallback command. A downstream domain object handler may be configured to execute the downstream fallback command when determined that the downstream link to an interface associated with the downstream resource is in a failed state.

The processor may be configured to send the downstream fallback command associated with the interface for the resource, wherein the domain object handler is configured to execute the fallback command when determined that the upstream link to the interface associated with the resource is in the failed state.

The processor may be configured to receive a request to define a downstream resource. The downstream resource may enable access to a downstream domain object handler that corresponds to a logical entity that controls a device or a port, or corresponds to a logical entity that controls another downstream resource. The processor may be configured to identify a downstream domain object for the downstream resource in the domain object database. The downstream domain object maps the downstream resource to the downstream domain handler for the computer device. The processor may be configured to identify the downstream interface for the downstream resource. The interface may specify one or more commands associated with the downstream resource. The downstream interface may be configured to receive the one or more commands through an upstream link from a client.

The processor may be configured to receive a fallback command associated with the interface for the downstream resource. The downstream domain object handler may be configured to execute the fallback command when determined that the upstream link associated with the interface is in the failed state. The processor may be configured to store the fallback command in the domain object associated with the downstream interface for the downstream resource. The processor may be configured to process, by the domain object handler, commands received by the resource based on the information stored in the resource record.

The processor may be configured to determine that the downstream link associated with the interface is in the failed state, and execute, by the downstream domain object handler, the downstream fallback command.

The processor may be configured to interpret, by the downstream domain object handler, the fallback command and generate a second downstream fallback command that corresponds to carrying out the semantic interpretation of the fallback command. A second downstream domain object handler is configured to execute the downstream fallback command when determined that a second downstream link to an interface associated with the second downstream resource is in a failed state.

BRIEF DESCRIPTION OF THE DRAWINGS

FIG. 6C is a diagram of exemplary code to configure resources the resource of FIG. 6B according to an embodiment;

DETAILED DESCRIPTION

Figure 1:
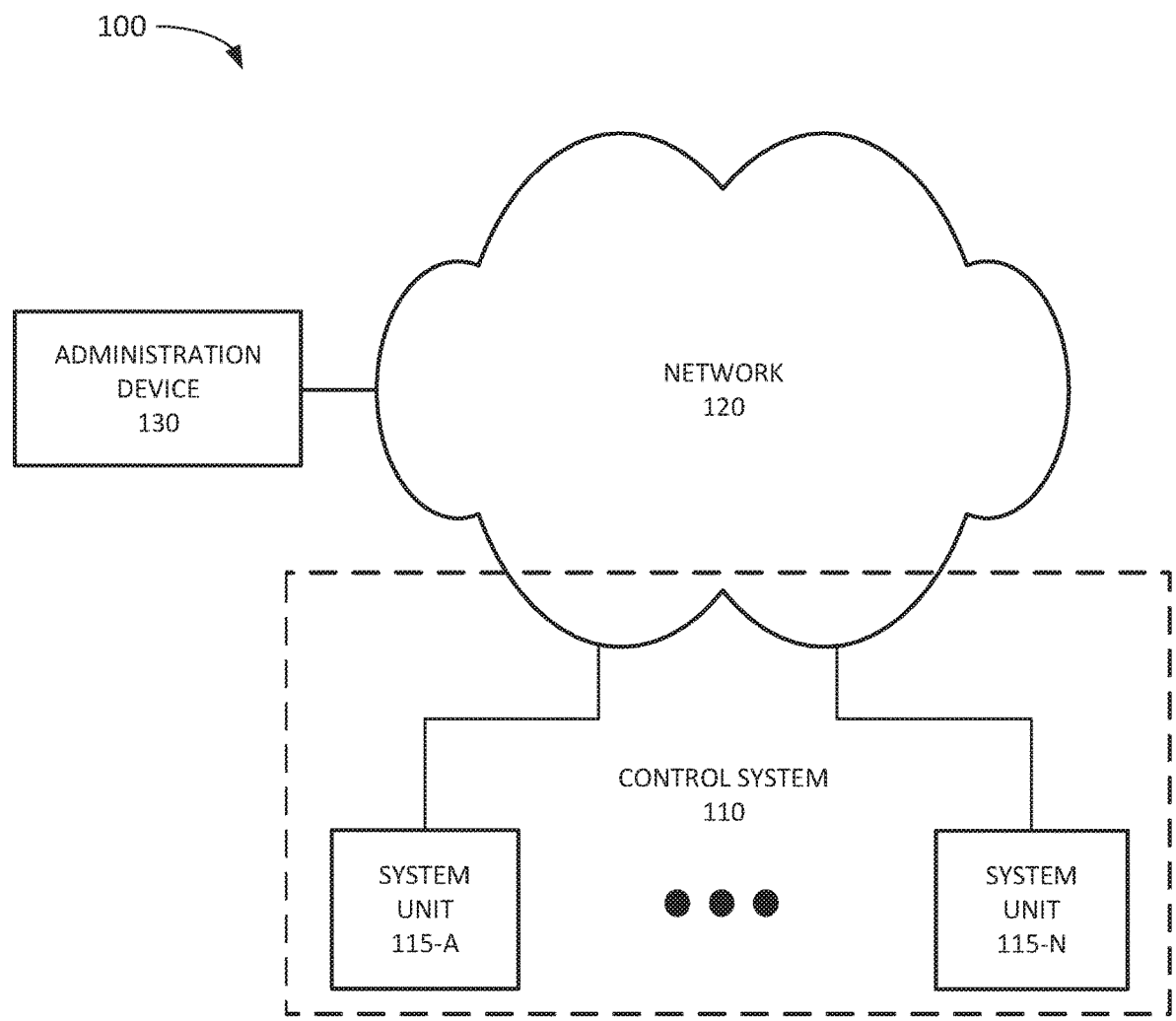
FIG. 1 is a block diagram illustrating an exemplary environment in one embodiment.

The following detailed description refers to the accompanying drawings. The same reference numbers in different drawings identify the same or similar elements.

Complex control systems may have many different controllers and processes running. When a communication link fails (or when a process fails), it may be desirable to have a command for a controller to execute to ensure that the control system fails to a known state. For example, if a door loses contact with the controlling process, it may be desirable for it to lock itself. But if the door is in a public building, it may be desirable for the door to unlock itself so that people do not become trapped. Methods and systems described below enable fallback commands to propagate throughout a system based, in one embodiment, on semantic interpretation of high-level context command.

A control system may include one or more controllers, each controlling a different part of the system. A controller may also control multiple peripheral devices. A physical access control system, for example, may include many controllers, each controlling physical access to an area of a facility. In such a system, a controller may control, for example, the following peripherals: a credential input device (e.g., a card reader or a keypad), a lock that locks a door, a sensor that senses whether the door is open or closed, and a motor that opens and closes the door. In this example, the controller may receive credentials from the card reader or keypad, and unlock and open the door if the credentials are authenticated.

Operators often encounter difficulties when configuring controllers and peripherals. In some instances, configuring a controller and its peripherals (such as a card reader and door lock) can be so complicated that misconfiguration is easy and yet difficult to detect. For example, a misconfigured lock could potentially be controlled through multiple communication paths and the control logic may not be perfectly aware of the state of the lock, thus believing that a door is locked when in fact the door is not locked. Misconfigured door logic could also correspond to a door that was physically removed and does not exist in the physical world, but still exists in the controller as a logical process awaiting to authenticate a card credentials value (a "ghost door").

In addition, different models of the same type of device (such as two different models of card reader) may use different commands, command formats, or data structures for control, operation, and/or communication. Some devices may even use different voltage levels or current flows to change a state (e.g., different models of lock). For example, take an access control system with a controller, card reader, and lock configured to unlock a door when authentic credentials are presented to the card reader. If the card reader is changed to a different model, the system may stop working and may need to be reconfigured (e.g., to a degree more than one would expect) even though the logical context has not changed and the new card reader is compatible—on a device level—with the remaining controller and lock. The degree of difficulty of reconfiguration increases the chance of misconfiguration and raises the level of expertise needed to reconfigure what would appear to be a minor change.

Configurations in large control systems can become so complex (e.g., in a large corporate campus) that a configuration process can take significant time, during which a communication link may be disrupted or a device may crash. In this case, the configuration may be incomplete, leaving the system state unknown and the operator unaware or frustrated with having to reset devices to a reconfigurable state. Additionally, if the configuration includes an error, some devices may be configured while other devices forgo the configuration because of the error. This may leave the system in an unexpected state until an error-free configuration can be determined and propagated.

These difficulties are exacerbated when the device-specific (or hardware) implementation of the system is not separated from the logical (e.g., context) implementation of the system. In other words, configuration may be more complicated and more challenging when the hardware or device implementation (e.g., model number) of system components is not separated from the logical context (e.g., card reader, door lock) of the system. One or more of the embodiments disclosed below may allow for improved configuration of control systems by separating the logical context from the underlying device implementations. One or more of the embodiments described below may also allow for improved configuration by providing an atomic configuration function, i.e., a configuration function that will either (1) fully and successfully complete or (2) make no change at all (e.g., return to its original state). One or more embodiments described below may also allow for clear "ownership" of control interfaces and/or peripheral devices. Ownership may prevent rogue or misconfigured devices from accessing, controlling, or configuring other resources in a system. Ownership may also enable a resource in a system to be identified and/or removed with its no longer required by the configuration.

Implementations described herein relate to a modular control system (such as a physical access control system) that represents functional elements managed by a controller as resources. In some implementations, the modular system may correspond to a modular physical access control system. In other implementations, the modular system may correspond to a monitoring system, such as a camera system. In yet other implementations, the modular system may correspond to a different type of system, such as an audio generating system.

A resource may enable access to a domain object that corresponds to a modular logical entity that represents a device or port or that corresponds to a modular logical entity that controls another domain object. A domain object may include a set of specifications that define how the domain object functions. For example, a domain object may include one or more interfaces that may be used by the domain object to receive commands or to send notifications. A domain object may be associated with one or more contracts that define how the domain object interacts with other domain object.

A domain object may present one or more resources to a configuration client or to other domain objects. A resource may be associated with a subset of interfaces associated with the domain object. Thus, for example, a first resource associated with the domain object may be associated with a first subset of interfaces to configure the domain object; a second resource associated with the domain object may be associated with a second subset of interfaces to control or use the domain object; a third resource associated with the domain object may be associated with a third subset of interfaces to send notifications to other domain objects, etc.

A domain object, as an example, may correspond to a logical entity that represents a device or port. For example, a peripheral device, such as a credentials reader, may be represented as a credentials reader domain object and made accessible to a configuration client, or to another domain object, as a credentials reader resource. The credentials reader resource may include a set of interface specifications that define how commands are sent to the credentials reader resource and how the credentials reader resource sends notifications of events to another resource.

A domain object, as another example, may correspond to a logical entity that controls another domain object via a resource (referred to as a target resource or as a server resource). For example, a door domain object may be defined that controls a credentials reader domain object, via a credentials reader resource, and that controls a lock domain object, via a lock resource. If the door domain object receives a notification from the credentials reader resource that authorized credentials were received by the credentials reader domain object, the door domain object may instruct the lock resource to unlock. In this example, the credentials reader domain object and/or the lock domain object may be modified or changed without necessarily affecting the functionality of the door domain object.

Furthermore, a resource may correspond to a collection of domain objects or an instance of a domain object. For example, a lock resource collection may include a set of lock resource instances available to a controller. An instruction to control a resource may refer to a resource collection and the controller may select an available domain object instance from the collection, as the operation or control of a resource must be directed to a specific domain object instance. Available resources may be organized into logical groupings of resource collections.

Each domain object may be associated with a domain object handler that includes code that processes operations associated with the domain object. A domain object handler, also referred to as just a handler, may execute code or instructions for domain objects of a particular type. Thus, a domain object handler may process the operations associated with domain object instances of a particular type. For example, a door domain object handler may handle operations for door domain object instances, a lock domain object handler may handle operations for lock domain object instances, a relay domain object handler may handle operations for relay domain object instances, a input/output port domain object handler may handle operations for input/output port domain object instances, etc.

Each resource may be included in, and/or presented by, a particular domain object instance that may remain dormant until registered with a domain object handler. A domain object handler may include code for running domain object instances of a particular type of domain object, process messages associated with the domain object instances of the particular type of domain object, maintain state information associated with the domain object instances of the particular type of domain object, execute scripts and/or other types of functions associated with the domain object instance of the particular type of domain object, and/or perform other types of processing associated with the domain object instances of the particular type of domain object. A domain object instance may not become active in the system unit until a configuration client device registers the domain object instance with a domain object handler.

Thus, a modular control system (such as a physical access control system) that represents functional elements (managed by a controller) as resources may improve the problem of compatibility and configuration management. In other words, a modular control system may represent functional relationships between elements as relationships between a client domain object and a target resource presented by a server domain object.

In such a modular system, defining the relationship between the domain objects (e.g., the functional elements managed by a controller) is a technical challenge. For example, if a domain object controls a port resource, the port resource should not necessarily be available to be used by another domain object. Furthermore, a first domain object, should be able to specify how a target resource, corresponding to a second domain object, is to be controlled (e.g., to the exclusion of other resources).

In such a modular system, defining the relationship between the domain objects (e.g., the functional elements managed by a controller) is a technical challenge. For example, if a domain object controls a port, the port should not necessarily be available to be used by another domain object. Furthermore, a resource, corresponding to a first domain object, should be able to specify how a target resource, corresponding to a second domain object, is to be controlled (e.g., to the exclusion of other resources).

Relationships between resources may be established by a configuration client using link selectors. A link selector corresponds to a configuration object included in a first domain object, also referred to as a client domain object, that specifies a target resource presented by a second domain object, also referred to as a server domain object, and that specifies how the target resource is to be controlled (or linked to) by a client domain object. The target resource may be also be referred to as a server resource, as the client domain object may send instructions to the server resource and/or may receive notifications from the server resource. The controller may generate a link between the client domain object and the server domain object based on the link selector if the controller determines that the target resource specified in the link selector can fulfill a request (such as to control the target resource through a particular interface, configure the target resource through a particular interface, and/or view the state of the target resource through a particular interface). Availability may be determined based on a contract associated with the target resource (e.g., the server resource).

A relationship between two domain objects may be established using a contract. A contract may specify the requirements of the relationship between the client domain object and a server resource presented by a server domain object. A contract may specify a client domain object, a server domain object, a type of interface through which the domain objects communicate, an interface through which the domain objects communicate, any notifications the server resource is required to send to the client domain object, and/or an established link via which the server resource and the client domain object communicate. The link may specify a communication path between the server domain object and the client domain object.

A resource (e.g., a server resource) may be able to execute and fulfill numerous contracts. Some contracts may be exclusive such that the server resource can only agree with one other resource (e.g., a client domain object) to execute and fulfill the requirements of the contract. An example of an exclusive contract is a contract to control the operation of the domain object associated with the target resource, such as a lock resource. In this example, only one client domain object (such as a door domain object) should be able to control the lock resource. This exclusivity prevents any other domain object from unlocking the door (and may help prevent misconfiguration). In this case, if a link selector requests that a domain object to be linked to a target resource through an interface for which the target resource already has an exclusive contract with a different client domain object, the link request will be denied and such a configuration will fail.

As stated above, if a link selector is approved and a new contract is generated between two domain objects based on the link selector, a link between the two domain objects may be generated. The implementation may depend on the underlying representation of the domain object and the underlying implementations may exist in various relationships with each other. The underlying representation of a domain object is referred to as a communication endpoint. Communication endpoints may exist in different location relationships with each other and different location relationships may require different message transport mechanisms for efficient communication.

As noted above, control systems may have many different controllers and processes running. When a communication link fails (or when a process fails), it may be desirable to have a command for a controller to execute to ensure that the control system fails to a known state. Methods and systems described below enable fallback commands to propagate throughout a system based, in one embodiment, on semantic interpretation of high-level context command.

FIG. 1 is a block diagram of an exemplary environment 100 in which the systems and/or methods described below may be implemented. As shown in FIG. 1, environment 100 may include a control system 110, a network 120, and an administration device 130.

Control system 110 may include a distributed computing system that includes system units 115-A to 115-N (referred to collectively as "system units 115" or individually as "system unit 115"). System unit 115 may implement a modular control system based on domain objects, which may be presented as resources to clients, as described herein. System unit 115 may be implemented as an embedded system. In some implementations, system unit 115 may include a control device, such as a physical access control device. For example, system unit 115 may include an access controller that controls access to a secured area, such as a room or a group of rooms. System unit 115 may receive credentials (e.g., access card credentials) via a reader device and determine whether the credentials are authentic and are associated with authority to access the secure area. If so, the access controller may issue a command to open a lock on a door or perform other operations associated with granting access to the secure area. In other implementations, system unit 115 may include a different type of security device, such as a monitoring device and/or a device that controls the operation of a machine.

Network 120 enables system units 115 to communicate with each other and/or may enable administration device 130 to communicate with system units 115. Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

Administration device 130 may include software (e.g., client software) to enable an administrator to connect to a particular system unit 115, configure the system unit 115, change the configuration of the system unit 115, receive information from the system unit 115, subscribe to notifications from the system unit 115, access information stored in the system unit 115, and/or otherwise administer control system 110. Administration device 130 may include any device configured for communicating with a system unit 115. For example, administration device 130 may include a portable communication device (e.g., a mobile phone, a tablet computer, and/or another type of wireless device); a personal computer or workstation; a server device; a laptop computer, and/or any type of computing device with communication capability.

In some implementations, administration device 130 may implement a "thin" client. A thin client may access system unit 115 without having to store any state information associated with system unit 115. For example, a thin client may implement a web page (e.g., JavaScript) that accesses information stored in system unit 115 and displays the information in one or more display objects included in the web page. In other implementations, administration device 130 may implement a "thick" client that stores state information associated with system unit 115. As a thick or thin client, administration device 130 may operate a browser that can access web pages (e.g., including hyper-text markup language and JavaScript) from a particular controller 210.

Although FIG. 1 shows exemplary components of environment 100, in other implementations, environment 100 may include fewer components, different components, differently arranged components, or additional components than depicted in FIG. 1. Additionally or alternatively, any one device in environment 100 (or any group of devices) may perform the functions described as performed by one or more other devices in environment 100. For example, in some implementations, system units 115 may include an input and/or output device (e.g., keyboard/keypad and display, touchscreen, etc.) and administration device 130 may not be needed.

Figure 2A:
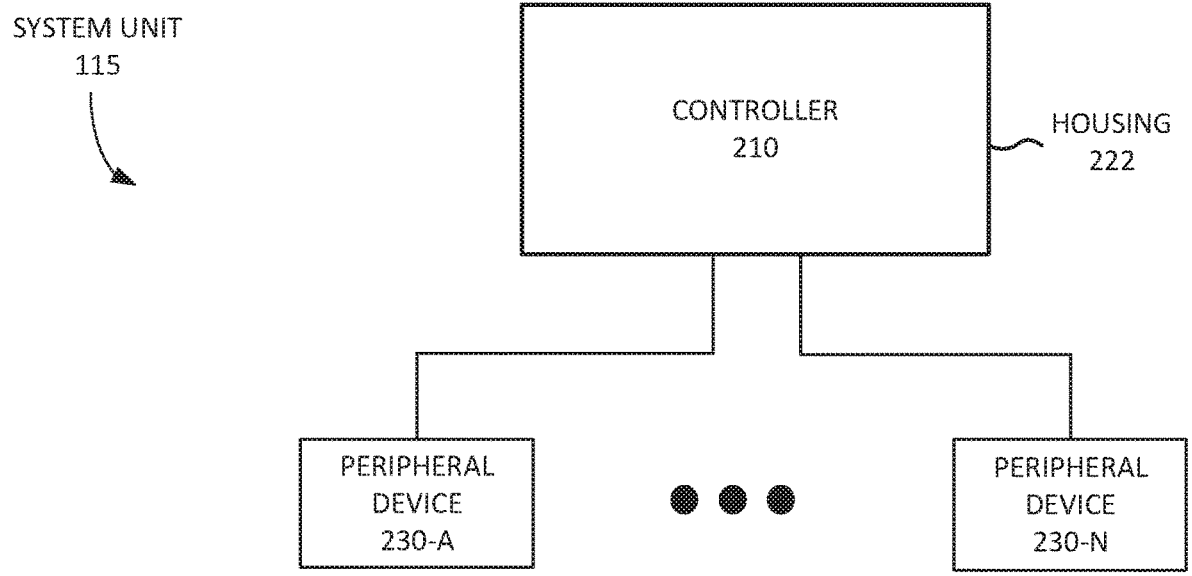
FIG. 2A is a block diagram illustrating exemplary components of a system unit of FIG. 1 in one embodiment.

FIG. 2A is a block diagram illustrating exemplary components of a system unit 115. As shown in FIG. 2A, system unit 115 may include a controller 210 and one or more peripheral devices 230-A to 230-N (referred to herein collectively as "peripheral devices 230" and individually as "peripheral device 230"). Controller 210 may control the operation of system unit 115, may communicate with other system units 115, may communicate with administration device 130, and/or may control peripheral devices 230. Controller 210 may include a computing module, which is described with reference to FIG. 2B.

Peripheral devices 230 may include one or more devices that communicate with controller 210, provide information to controller 210, and/or that are controlled by controller 210. For example, a peripheral device 230 may include a reader device that reads credentials from a user and provides the credentials to controller 210. The reader device may include a keypad configured to receive an alphanumeric personal identification number (PIN) from a user; a card reader to configure a card that stores a card code on a magnetic strip or another type of storage device, such as an RFID tag or NFC chip; a fingerprint reader configured to read a user's fingerprint; an iris reader configured to read a user's iris; a microphone configured to record a user's voice for a voice signature; and/or another type of reader device. The reader device may include any type security device that can provide credentials, and may additionally include one or more sensor devices, such as, for example, a camera used for facial recognition and/or a microphone used for voice recognition.

As another example, a peripheral device 230 may include a lock controlled by controller 210 via, for example, a relay device (e.g., within controller 210). The lock may lock a door (e.g., prevent it from opening or closing), an elevator, a window, an HVAC vent, and/or another type of access opening to a secure area. For example, the lock may include an electromagnetic lock; a mechanical lock with a motor controlled by controller 210; an electromechanical lock; and/or another type of lock. Furthermore, the lock may lock/unlock operation of a machine, transport vehicle, elevator, and/or an electrical device. As another example, a peripheral device 230 may include a relay device that is controlled by controller 210 via a general input/output port. The relay device may control, for example, a door.

As yet another example, peripheral device 230 may include a sensor device. For example, a sensor device may include a door sensor to sense whether a door is open or closed; a visible light monitoring camera, an infrared (IR) light monitoring camera, a heat signature monitoring camera, and/or another type of monitoring device; an alarm sensor, such as a motion sensor, a camera with motion detection software, a heat sensor, a pressure sensor, and/or another type of alarm sensor; an audio recording device (e.g., microphone); a tamper sensor, such as a position sensor located inside system unit 115; and/or a "request to exit" button located within a secured area associated with system unit 115; and/or another type of sensor device.

As another example, peripheral device 230 may include an actuator device. For example, an actuator device may include an illumination device; a burglar alarm activator; a speaker to play messages or generate alarm signals; a display device; a motor to move a sensor device (e.g., control the field of view of a camera or other monitoring device); a motor for opening/closing a door, window, HVAC vent, and/or another opening associated with a secure area; a motor to secure lock device a in a locked or unlocked position; a fire extinguishing device; and/or another type of actuator device.

As yet another example, system unit 115 may correspond to a camera system, with controller 210 corresponding to a controller of the camera unit and peripheral devices 230 corresponding to sub-systems of the camera system. For example, a first peripheral device 230 may correspond to a camera head with a lens system, a second peripheral device 230 may correspond to a pan-tilt-zoom (PZT) motor assembly, a third peripheral device 230 may correspond to a storage device to store an image stream captured by the camera head or to a transceiver device to transmit the image stream to another device, etc.

Housing 222 may enclose the components of controller 210 to protect the components of controller 210 from the environment. In one embodiment, housing 222 may house one or more of peripheral devices 230. In another embodiment, housing 222 may not include peripheral devices 230. In yet another embodiment, housing 222 may include administration device 130. Housing 222 may define the boundaries of one system unit 115 and/or controller 210 from other system units 115 and/or controllers 210 in a multi system unit 115/controller 110 system. Housing 222 may also define the boundaries of controller 210 from one or more peripherals 230.

Figure 2B:
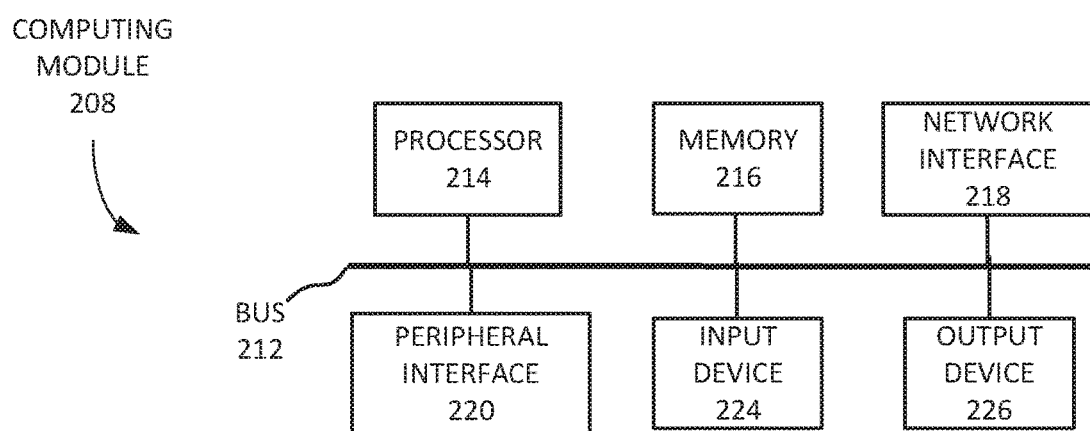
FIG. 2B is a block diagram illustrating exemplary components of a computing module that may be included in a component of FIG. 1 or FIG. 2A.

FIG. 2B is a block diagram illustrating exemplary components of a computing module 208. Controller 210 and/or peripheral device 230 may include one or more computing modules 208. Other computing devices in environment 100, such as administrative device 130, may also include one or more computing modules 208. Computing module 208 may include a bus 212, a processor 214, a memory 216, a network interface 218, a peripheral interface 220, and a housing 222.

Bus 212 includes a path that enables communication among the components of controller 210. Processor 214 may include one or more of any type of single-core processor, multi-core processor, central processing unit (CPU), graphics processing unit (GPU), tensor processing unit (TPU), microprocessor, latch-based processor, and/or processing logic (or families of processors, microprocessors, and/or processing logics) that interprets and executes instructions. Additionally or alternatively, processor 214 may include an application-specific integrated circuit (ASIC), a field-programmable gate array (FPGA), and/or another type of integrated circuit or processing logic.

Memory 216 may include any type of dynamic storage device that may store information and/or instructions, for execution by processor 214, and/or any type of non-volatile storage device that may store information for use by processor 214. For example, memory 216 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Network interface 218 may include a transceiver (e.g., a transmitter and/or a receiver) that enables controller 210 to communicate (e.g., transmit and/or receive data) with other devices and/or systems via wired communication links (e.g., conductive wire, twisted pair cable, coaxial cable, transmission line, fiber optic cable, and/or waveguide, etc.), wireless communication links (e.g., radiofrequency (RF), infrared, and/or visual optics, etc.), or a combination of wireless and wired communication links. Network interface 218 may include a transmitter that converts baseband signals to RF signals and/or a receiver that converts RF signals to baseband signals. Network interface 218 may be coupled to an antenna for transmitting and receiving RF signals.

Network interface 218 may include a logical component that includes input and/or output ports, input and/or output systems, and/or other input and output components that facilitate the transmission of data to other devices. For example, network interface 218 may include a network interface card (e.g., Ethernet card) for wired communications and/or a wireless network interface (e.g., a WiFi, cellular, etc.) card for wireless communications. Network interface 218 may also include a universal serial bus (USB) port for communications over a cable, a Bluetooth wireless interface, a radiofrequency identification (RFID) interface, a near-field communications (NFC) wireless interface, and/or any other type of interface that converts data from one form to another form.

Peripheral interface 220 may be configured to communicate with one or more peripheral devices 230. For example, peripheral interface 220 may include one or more logical components that include input and/or output ports, input and/or output systems, and/or other input and output components that facilitate the transmission of data to peripheral devices 230. As an example, peripheral interface 220 may communicate with peripheral devices using Serial Peripheral Interface Bus protocol, such as a Wiegand protocol, an RS-485 protocol, a relay, and/or another type of protocol. As another example, peripheral interface 220 may use a different type of protocol. In one embodiment, network interface 218 may also act as a peripheral interface for coupling peripherals 230 to controller 210.

Some computing modules 208 (e.g., in administration device 130) may also include input device 224 and/or output device 226. Input device 224 may enable a user to input information into computing module 208. Input device 224 may include a keyboard, a mouse, a pen, a microphone, a camera, a touch-screen display, etc. Output device 226 may output information to the user. Output device 226 may include a display, a printer, a speaker, etc. Input device 224 and output device 226 may enable a user to interact with applications (e.g., a web browser) executed by computing module 208. In the case of a "headless" device (e.g., controller 210), input and output is primarily through network interface 218 rather than input device 224 and output device 226.

Controller 210, peripheral device 230 and/or administration device 130 (e.g., each employing a different computing module 208) may perform operations relating to a modular control system, such as selecting links within the modular system, setting up a transport layer within the modular control system, propagating fallback commands within the modular control system, and/or viewing resources within the modular system. Computing module 208 may perform these operations as a result of hardwired circuitry of an ASIC. Additionally or alternatively, computing module 208 may perform these operations in response to processor 214 executing software instructions contained in a computer-readable medium, such as memory 216. A computer-readable medium may include a non-transitory memory device. A non-transitory memory device may be implemented within a single physical memory device or spread across multiple physical memory devices. The software instructions may be read into memory 216 from another computer-readable medium or from another device. The software instructions contained in memory 216 may cause processor 214 to perform processes described herein. Thus, implementations described herein are not limited to any specific combination of hardware circuitry and software.

Although FIGS. 2A and 2B show exemplary components of system unit 115 and computing module 208, in other implementations, system unit 115 may include fewer components, different components, additional components, or differently arranged components than depicted in FIG. 2A. Additionally or alternatively, any component of system unit 115 (or any group of components) may perform the task or tasks described as performed by one or more other components of system unit 115. For example, in some implementations, peripheral interface 220 may correspond to a network interface. As another example, in some implementations, peripheral devices 230 may be connected to controller 210 via network interface 218, rather than via peripheral interface 220.

Further, although examples of control system 110 may include a physical access control system, other implementations may control systems other than physical access systems. For example, control system 110 may include a system to control a fan (e.g., start or stop), to initiate an alarm in a building management system (e.g., failed or successful authentication), to control traffic lights, or to control robots in an industrial automation system. As a physical access control system, control system 110 may include any type of physical access control systems (e.g., in different operational environments), such as a control system for opening and/or closing a door, controlling physical access to a building or facility, controlling hotel room doors for hotel guests, and/or controlling elevator floor access.

Figure 3A:
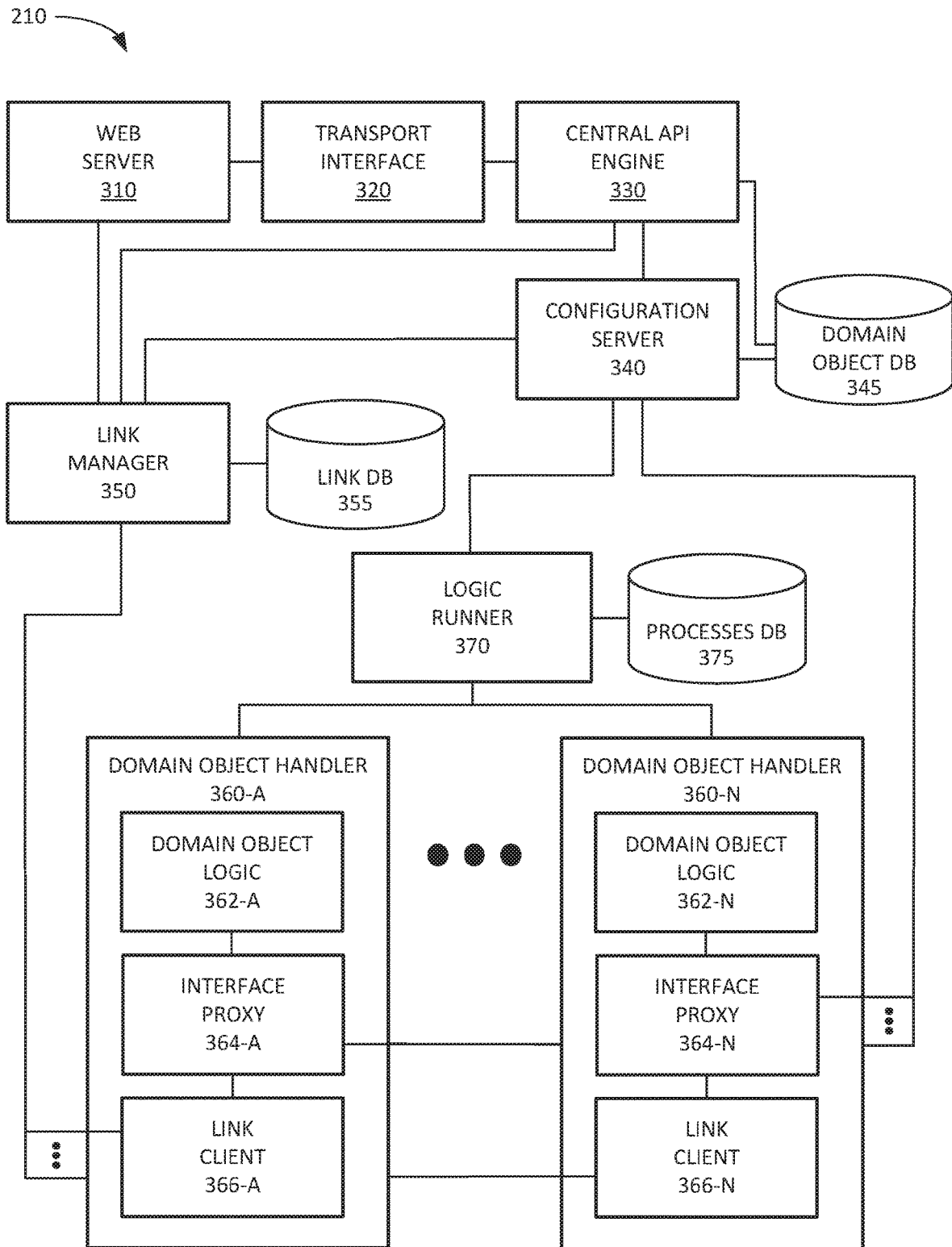
FIG. 3A is a block diagram illustrating exemplary functional components of the controller device of FIG. 2A according to one embodiment.

FIG. 3A is a block diagram illustrating exemplary functional components of controller 210. The functional components of controller 210 shown in FIG. 3A may be implemented, for example, via processor 214 executing instructions from memory 216. Alternatively or additionally, some or all of the components of controller 210 may be implemented via hard-wired circuitry.

The functional components of controller 210 may implement a modular architecture of a control system. The modular control system may include services and/or resources in which, for example, relationships between resources are abstracted from the underlying implementation of a particular resource. As shown in FIG. 3A, controller 210 may include a web server 310, a transport interface 320, a central API engine 330, a configuration server 340, a domain object DB 345, a link manager 350, a link DB 355, domain object handlers 360-A to 360-N (referred to collectively as "domain object handlers 360" and individually as "domain object handler 360" or more simply "handlers 360" and "handler 360"), a logic runner 370, and/or a processes DB 375.

Web server 310 implements a web server that, in one embodiment, acts as a point of entry into controller 210 for other devices that seek to communicate with controller 210, such as other system units 115, administration device 130, and/or other types of devices. Web server 310 may establish a secure connection with a device that seeks to communicate with controller 210 using, for example, Transport Layer Security (TLS), Hypertext Transfer Protocol (HTTP), HTTP Secure (HTTPS), and/or another protocol. Furthermore, web server 310 may perform authentication, authorization, and accounting (AAA) for incoming traffic and may route authentication and authorized traffic to central API engine 330 and/or to link manager 350. Furthermore, web server 310 may host one or more web applications that enable administration device 130 to interact with controller 210.

Transport interface 320 may convert messages received by web server 310 into a format used by central API engine 330 and convert messages from central API engine 330 into a format used by a client communicating with web server 310. For example, transport interface 320 may convert a Hypertext Transfer Protocol (HTTP) GET request for information into an API call or request that may be processed by central API engine 330 to obtain the information. Transport interface 320 may then convert an API response from central API engine 330 into an HTTP response for the client. As another example, transport interface 320 may convert an HTTP POST request into an API call to configure a particular resource. As yet other examples, transport interface 320 may convert a Representational State Transfer (REST) request into an API call, convert a Remote Procedure Call (RPC) into an API call, convert a web socket call into an API call, and/or may perform a conversion from another type of communication method into an API call to be processed by central API engine 330.

Central API engine 330 processes API requests associated with resources. An API call may create, remove, modify, and/or request information about a resource, for example. Furthermore, an API call may create, delete, or modify a collection of resources. Additionally, central API engine 330 may include a link client 366 (described below) for communicating directly with link clients 366 of resources. When a command needs to be sent to a particular resource, link client 366 of central API engine 330 may send the command to link client 366 of the particular resource.

In creating a resource, central API engine 330 may identify a domain object associated with the resource, select and/or identify one or more interfaces for the resource from a set of interfaces associated with the identified domain object, and/or define one or more communication links to another resource for the resource.

Configuration server 340 may configure a domain object handler based on information stored in domain object DB 345. Domain object DB 345 may store information relating to (e.g., data structures defining) domain objects managed by controller 210. Exemplary information that may be stored in domain object DB 345 is described below with reference to FIG. 4A. Configuration server 340 may control domain object DB 345 and process updates to domain object DB 345. For example, configuration server 340 may process updates received from central API engine 330 relating to the configuration of a domain object handler associated with a domain object that defines a resource. Furthermore, configuration server 340 may update the state of a domain object based on information received from a domain object hander 360 associated with the domain object. For example, a domain object may report a change in a state via an interface using interface proxy 364 and configuration server 340 may update a domain object to record the change in the state.

Furthermore, configuration server 340 may respond to requests for data from central API engine 330. For example, central API engine 330 may request information relating to a first domain object and a second domain object when generating a new contract between the first domain object and the second domain object to determine whether the new contract can be generated. Furthermore, configuration server 340 may report error messages to central API engine 330, such as any failure or error messages reported by a domain object. Central API engine 330 may then report such failures or errors to a user via web server 310, for example. Additionally, configuration server 330 may ensure that resources (e.g., all resources) are associated with a domain object handler 360 and may instruct logic runner 370 to create or select a domain object handler 360 for a particular resource.

Link manager 350 manages communication links between domain object handlers using information stored in link DB 355. A link between a first domain object and a second domain object represents the ability of the code executing on behalf of the first and second domain objects (e.g., domain object handlers) to communicate with each other. As such, the link manager 350 may associate a link specified in domain objects with an implementation of that link, which defines a communication path between the first domain object handler and the second domain object handler. Link manager 350 may receive a request from configuration server 340 to implement a link between a first domain object handler and a second domain object handler based on a contract between the first domain object and the second domain object. Link manager 350 may make determinations regarding how to implement the link as a communication path, such as whether the first domain object handler and the second domain object handler are associated with the same process and/or are implemented on the same device.

If the first domain object handler and the second domain object handler are associated with the same process ID, link manager 350 may identify a memory buffer used by the first domain object handler and the second domain object handler to communicate with each other. If the first domain object handler and the second domain object handler are associated with different process IDs in the same device, link manager 350 may select an inter-process communication mechanism to be used by the first domain object handler and the second domain object handler to communicate with each other. For example, in some implementations, link manager 350 may generate an inter-process socket (e.g., a Linux domain socket), connect the generated socket to the second domain object handler, and instruct the first domain object handler to send and receive data to and from the second domain object handler using the generated socket. In other implementations, link manager 350 may select a different type of inter-process communication, such as a pipe, a software bus, or a storage file to be used by the first domain object and the second domain object to communicate with each other.

If the first domain object handler and the second domain object handler are associated with different devices (e.g., the first domain object handler is associated with system unit 115-A and the second domain object handler is associated with system unit 115-B), link manager 350 may identify the other device associated with the second domain object handler and then generate a communication path to the other device.

As another example, link manager 350 may identify the other device based on information included in the link selector associated with the link. For example, the link selector in the first domain object may include a device ID associated with the other device that includes the second domain object. As an example, the second domain object may be identified in the link selector by a Uniform Resource Identifier (URI) that includes a path name that identifies the other device and the second resource. As yet another example, link manager 350 may, when generating a communication path for a link, query other devices in control system 110 to determine which device is associated with the domain object handler associated with the second domain object. For example, link manager 350 may send a message to the other devices with a resource ID for the second resource, requesting a response from a particular system unit 115 identifying whether the domain object associated with the second resource is included in the domain object DB 345 of the particular system unit 115.

After the other device is identified, link manager 350 may establish a secure communication path to link manager 350 located in the other device. For example, the two link managers 350 from the two devices may exchange information (such as network addresses and/or ports) to establish a socket between the two domain objects on different devices. Additionally, or alternatively, the two link managers 350 may perform a TLS handshake to exchange key information for encrypted communication. Link manager 350 may store information associated with an implemented link in link DB 355. Link manager 350 may also send the information associated with an implemented link to link client 366 associated with the end-point resources (e.g., link client 366-A and link client 366-B). In this way, the communication path does not necessarily pass through link manager 350 (thus avoiding a bottleneck) and domain objects may communicate with each other (via respective link clients 366). Thus, link manager 350 configures links between domain object handlers and link clients 366 of the resources send and receive messages via the configured link.

Domain object handler 360, also referred to as a handler 360, may handle domain objects (e.g., domain objects of a particular type). Handler 360 may execute code to provide resources in a service through interfaces exposed by handler 360 (e.g., as defined in a domain object). In one embodiment, each different type of domain object may be managed by a different domain object handler 360. As an example, if system unit 115 controls two different types of locks (e.g., each being a peripheral 230 to a controller 210), system unit 115 may run two different domain object handlers 360, a first domain object handler 360 for domain object instances associated with the first type of lock and a second domain object handler 360 for domain object instances associated with the second type of lock. As another example, a first domain object handler 360 may execute code associated with a first type of door (e.g., a swing door), and a second domain object handler 360 may execute code associated with a second type of door (e.g., a sliding door).

A domain object instance of a particular type may be defined in a domain object data structure stored in domain object DB 345 and code/instructions associated with the operation or functioning of domain object instances of the particular type may be handled by a particular domain object handler 360 configured for the particular type of domain object instances. Domain object handler 360 may include a domain object logic 362, an interface proxy 364, and a link client 366.

Domain object logic 362 may include logic to implement functions and/or process instructions associated with domain object instances of a particular type of domain object. For example, domain object logic 362 may identify a particular port, one or more pins of an input/output port and/or a particular device (e.g., a relay controlling a lock). Furthermore, domain object logic 362 may include a device driver for a particular peripheral device 230, a set of instructions to control the particular peripheral device 230, one or more libraries of functions associated with the particular domain object, and/or other types of logic and/or instructions to implement the particular domain object.

Interface proxy 364 may implement one or more interfaces associated with the particular domain object and/or type of domain object. As an example, configuration server 340 may send instructions to a handler associated with an instance of a domain object type via interface proxy 364 using a particular interface. As another example, configuration server 340 may receive a notification and/or may request a piece of information about the domain object instance (e.g., through the associated handler) via interface proxy 364 using a particular interface.

Link client 366 may interface with and (in some instances) be configured by link manager 350. For example, link client 366 may receive information about an implementation of a link that defines a communication path between it and another link client 366 associated with another domain object. Link client 366 may use this information to send and/or receive messages through the communication path to/from the other domain object (e.g., via the associated handler). The destination domain object may be located in the same device or in a different device. If the destination is located in the same device, link client 366 may forward the message to a link client 366 associated with the second domain object (e.g., by using a memory buffer or an interprocess socket). If the destination domain object handler is located on a different device (e.g., another system unit 115 or administration device 130), link client 366 may pass the message through web server 310. Similarly, link client 366 may receive a message from a domain object on another device via web server 310.

In one embodiment, link manager 350 may act as a go-between, intermediary, or proxy between two domain objects. In this embodiment, a link client 366 may send a message to another domain object handler via link manager 350 or may receive a message from another domain object handler via link manager 350. In this embodiment, link manager 350 may route messages between domain object handlers based on information stored in link DB 355. As an example, link manager 350 may receive a message from a first domain object handler, associated with a first domain object and destined for a second domain object, identify an implementation of the link between the first domain object handler and the second domain object handler based on information stored in link DB 355, and forward the message to a destination associated with the second domain object handler.

Logic runner 370 may run processes in controller 210. A particular process may execute domain object handler 360 associated with domain object instances of a particular type. Particular domain objects may be associated with particular processes via an identifier referred to as a slot. Each process may be associated with a priority and processes with a higher priority may be assigned more processor time. A particular domain object may be linked to a particular process via a slot. A particular process may execute resources (e.g., activated resources) that are deployed and running in a control system. Information relating to processes managed by logic runner 370 may be stored in processes DB 375.

Although FIG. 3A shows exemplary functional components of controller 210, in other implementations, controller 210 may include fewer functional components, different functional components, differently arranged functional components, or additional functional components than depicted in FIG. 3A. Additionally, any one of the components (or any group of components) of controller 210 may perform functions described as performed by one or more other functional components of controller 210.

Figure 3B:
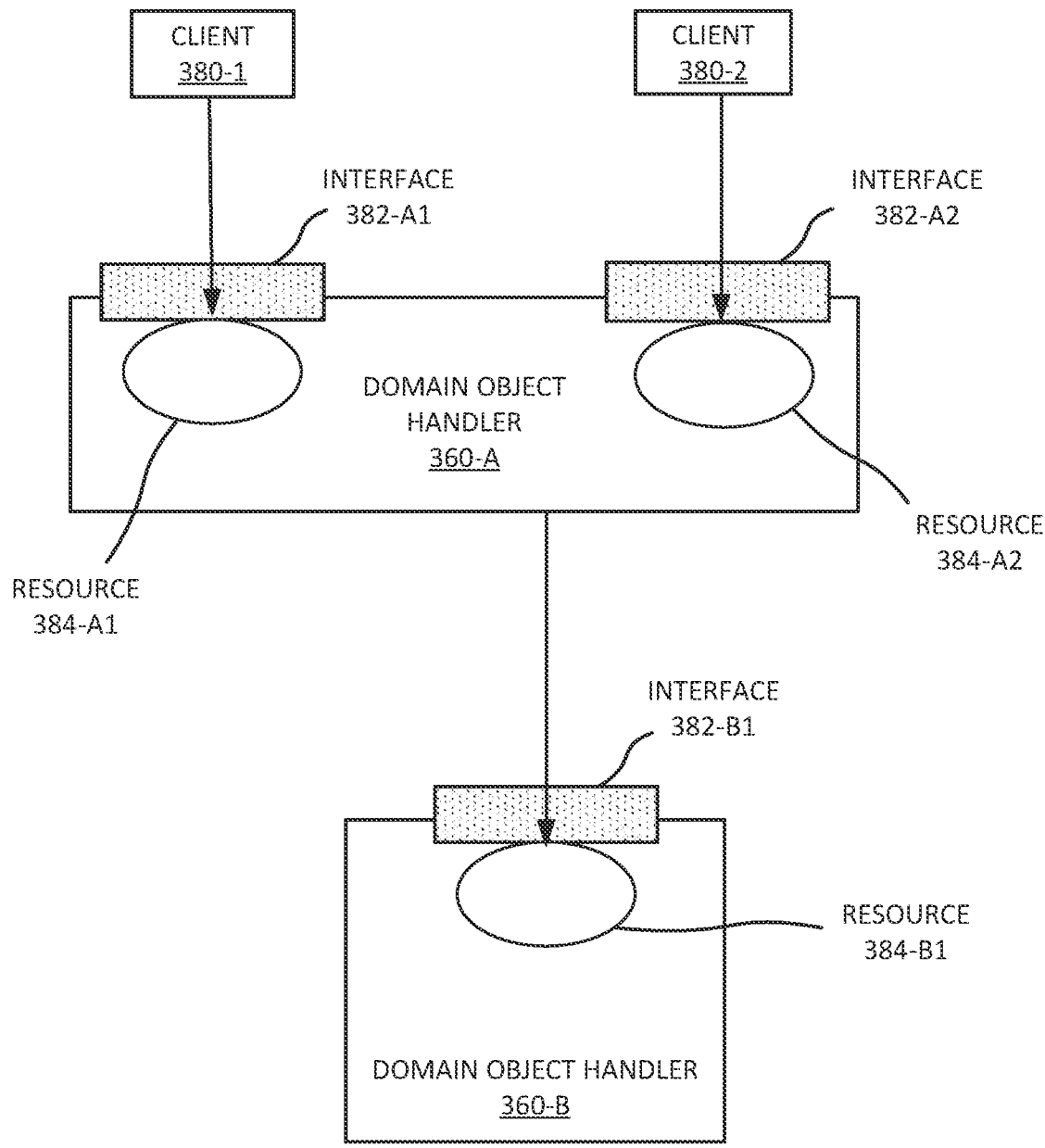
FIG. 3B is a diagram illustrating an exemplary configuration of domain object handlers according to an embodiment.

FIG. 3B illustrates an exemplary configuration 377 of domain object handlers 360 (or more simply "handlers 360" if plural or "handler 360" if singular), clients 380, interfaces 382, and resources 384 in one embodiment. Configuration 377 includes two clients: client 380-1 and client 380-2. Clients 380 may represent external client software (e.g., hosted by administration device 130) and/or an internal client (e.g., another domain object handler 360). Configuration 377 also has two domain object handlers 360: a first handler 360-A and a second handler 360-B.

First handler 360-A provides a service that includes two resources: resource 384-A1 and resource 384-A2. First handler 360-A also exposes two interfaces 382, provided by the service, for the two resources: first interface 382-A1 for resource 384-A1, and second interface 382-A2 for resource 384-A2.

Second handler 360-B provides a service that includes one resource 384: resource 384-B1. Second handler 360-B exposes one interface 382, provided by the service, for the resource: an interface 382-B1 for resource 384-B1. Second handler 360-B acts as a server to provide resource 384-B1 of a service to its client (e.g., first handler 360-A).

Figure 4A:
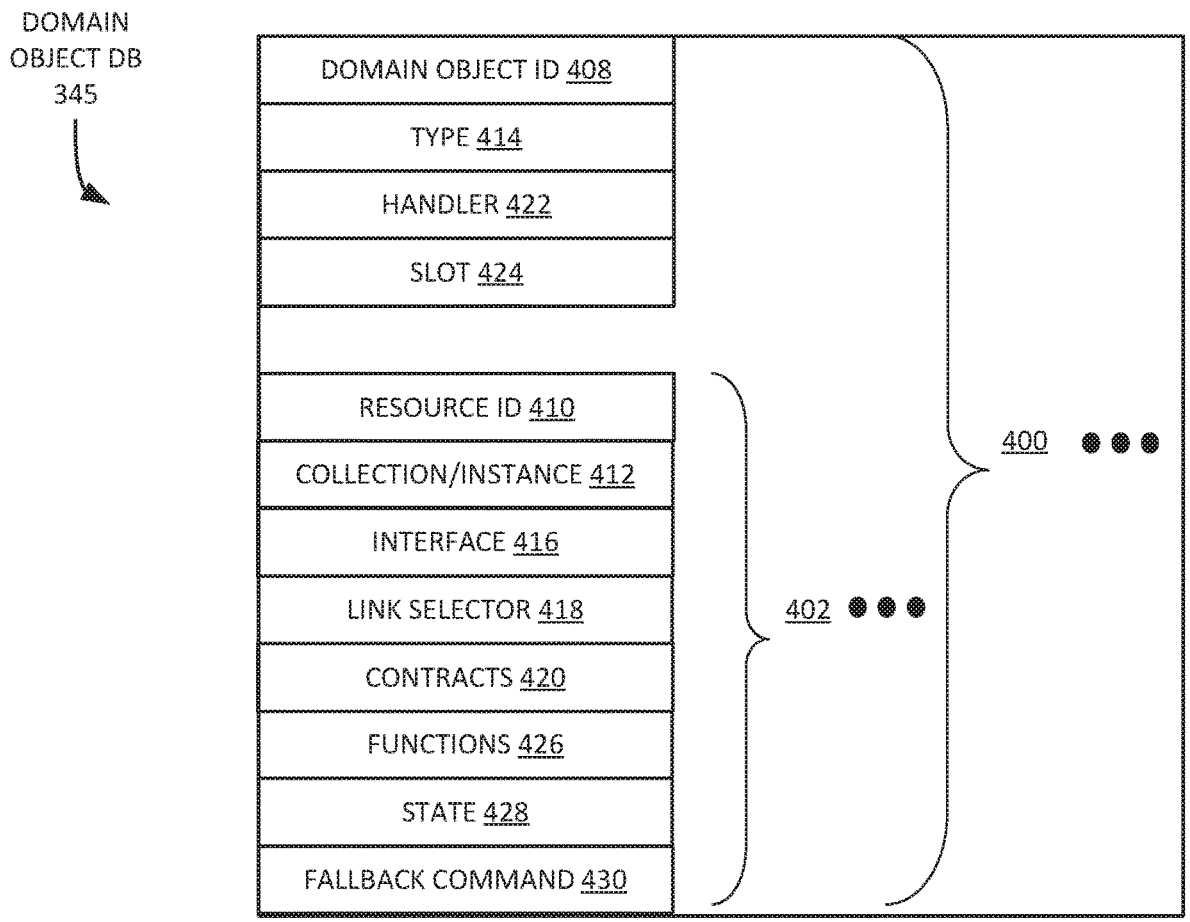
FIG. 4A is a diagram illustrating exemplary information that may be stored in the resource database of FIG. 3 according to one embodiment.

FIG. 4A illustrates exemplary information (e.g., data structure(s) and/or records) that may be stored in domain objects DB 345. As shown in FIG. 4A, domain objects DB 345 may include one or more domain objects 400 (referred to in the singular as "domain object 400"). Domain object 400 may store information relating to a domain object handler, such as the services provided by the handler, the interfaces exposed by the handler, and/or resources that correspond to the interfaces.

Domain object 400 may include a domain object identifier (ID) field 408, a type field 414, a handler field 422 (or domain object handler field 422), and/or a slot field 424. Domain object 400 may also include one or more resource records 402 (referred to in the singular as "resource record 402"). Resource record 402 may correspond to a resource provided by a domain object handler as part of a service. Some or all of the fields described as being in resource record 402 may be included in domain object 400, such as state field 428.

Domain object ID field 408 may store an identifier associated with domain object 400. The domain object identifier may be generated when the corresponding domain object is created and may be unique to the domain object. The identifier may be a universally unique identifier (UUID) for the domain object.

Type field 414 may store information identifying a type of domain object for domain object 400. For example, the type may specify a type of device or port associated with the particular domain object, a type of logical entity (e.g., a type of door or another type of portal, such as a window, elevator door, HVA vent, etc.), a make and/or model for a type of device, a software version associated with a device or device driver, and/or other information that may specify a type of domain object. Handler field 422 may store information identifying domain object handler 360 associated with the resource and/or domain object.

Slot field 424 may store information identifying a slot associated with the particular domain object 400. A slot may correspond to a process ID that associates the particular domain object to a particular process managed by logic runner 370. Thus, the slot may associate the particular domain object to a process ID (PID) running on controller 210.

As noted, a domain object 400 may include one or more resource records 402. Resource record 402 may include a resource ID field 410, a collection/instance field 412, an interface field 416, a link selector field 418, a contracts field 420, a function field 426, a state field 428, and/or a fallback command field 430.

Resource ID field 410 may store an identifier associated with the corresponding resource. The identifier may be generated when the resource is created and may be unique to the resource. In one implementation, the resource identifier field may include a path name based on the resource location in the resource tree (e.g., portal/door/1) and/or may also be associated with a universally unique identifier (UUID).

Collection/instance field 412 may store information identifying whether the particular domain object corresponds to a resource collection or to a resource instance.

Interface field 416 may store information relating to one or more interfaces associated with the resource. A domain object may be associated with many interfaces, and each resource associated with the domain object may be associated with a subset of those interfaces. Interface field 416 may also identify a schema for the interface. The schema may specify the format for the interface, such as the required fields and data types for each field. Furthermore, interface field 416 may identify one or more commands that may be sent to the particular resource using the interface. Moreover, interface field 416 may identify one or more notifications that may be generated by the domain object using the interface.

Link selector field 418 may store one or more link selectors associated with the resource and/or domain object. Exemplary information that may be stored in link selector field 418 is described below with reference to FIG. 4B.

Contracts field 420 may store information relating to one or more contracts associated with the resource. A contract may identify the entity (e.g., another resource or handler) that is authorized to use a particular interface of another resource or handler. In this way, the interface may be used (e.g., exclusively) by the authorized entity, for example. A contract may identify a client domain object, a server domain object, an interface associated with the contract, a link between the client domain object and the server domain object, and any notifications (e.g., a subscription to a notification) that may be sent by the server domain object to the client domain object as part of the contract. In some implementations, an executed contract may have two parts: one for each party to the contract and each party may be associated with one of the parts. In some implementations, the contract may also include a field that specifies whether the contract is an exclusive type or not an exclusive type.

Function field 426 may store information relating to one or more functions to be performed by the handler corresponding to the resource. For example, function field 426 may store a function for the handler to interpret a fallback command (e.g., stored in fallback command field 430) to generate another fallback command for another (e.g., server) resource to execute should communication between the domain object and the server resource fail. As another example, function field 426 may store a function for the handler to generate a command for another resource linked to by the handler. The function may generate the command in response to a detected condition (e.g., a broken communication path), to generate a notification for a client or another resource, or may include another type of function. Examples of such functions may include applying one or more access rules to a credentials value, maintaining a particular state for a particular period of time (e.g., a maximum time period a lock is allowed to be in an unlocked state), sending a notification message in response to detecting an event, storing information associated with an event, etc. In some implementations, a function may be defined using a script.

State field 428 may store information relating to one or more states associated with the particular resource. For example, state field 428 may store information identifying whether the particular resource has been activated. Moreover, state field 428 may store information relating to one or more functional states associated with a resource, such as, for example, whether the resource is operational, any error states associated with the resource, what state the resource is currently in (e.g., is a lock locked or unlocked, is a door open or closed, how many people are in a room, is a port sending or receiving data, is an indicator light on or off etc.).

Fallback command field 430 may specify a command that the associated handler should execute if the domain object handler 360 is no longer in communication with the client domain object handler 360 (e.g., through the interface specified in interface field 416). The fallback command recorded in fallback command field 430 may be received during a configuration process or operational process, for example, through an interface associated with configuration.

As mentioned above, some domain objects 400 may store information relating to resource instances and other domain objects 400 may store information relating to resource collections (e.g., a collection of resources of a particular type). A resource associated with a collection of resources may be referred to as a service associated with that collection of resources. For example, a "configuration" or "installation" service may provide a resource for configuring other resources. Each service may be associated with its own domain object handler 360. Thus, each service may correspond to a particular domain object type.

Although FIG. 4A show exemplary components that may be stored in domain objects DB 345, in other implementations, domain objects DB 345 may include fewer components, different components, differently arranged components, or additional components than depicted in FIG. 4A.

Figure 4B:
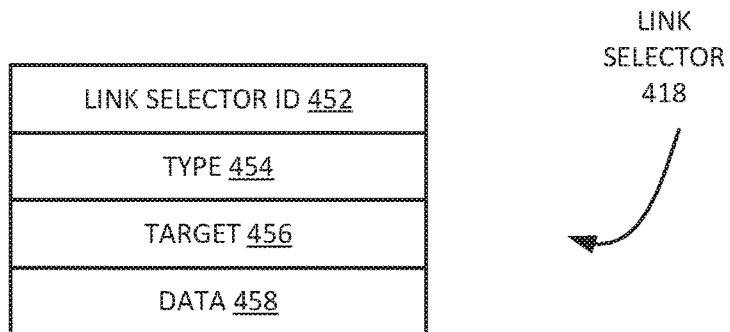
FIG. 4B is a diagram illustrating exemplary information that may be stored in a link selector field of FIG. 4A according to one embodiment.

FIG. 4B is a diagram illustrating exemplary information that may be stored in link selector field 418. As shown in FIG. 4B, link selector field 418 may include a link selector ID field 452, a type field 454, a target field 456, and a data field 458.

Link selector ID field 452 may store an identifier associated with a particular link selector. The identifier may be generated when the corresponding link selector field is created and may be unique to the link. The identifier may be a universally unique identifier (UUID) for the link selector.

Type field 454 may identify a type associated with the particular link selector. A link selector may correspond to a "use," "configuration," or "private" type. A "use" type may indicate that the client domain object is configured to use the target resource without configuring the target resource. A "configuration" type may indicate that the client domain object is configured to use the target resource and to change the configuration of the target resource. A "private" type link selector may indicate that the target resource is created by the link selector for the exclusive use of the client domain object.

Target field 456 may identify the target resource associated with the particular link selector. The target resource may correspond to the server resource included in the server domain object and the domain object that includes the particular link selector may correspond to the client domain object that uses/controls the server or target resource.

Data field 458 may include configuration data associated with the particular link selector. For example, the configuration data may configure the target resource into a particular state, instruct the target resource to provide a particular type of notification to the client domain object, and/or other types of configuration instructions.

Although FIG. 4B shows exemplary components that may be stored in link selector field 418, in other implementations, link selector field 418 may include fewer components, different components, differently arranged components, or additional components than depicted in FIG. 4B.

Figure 5A:
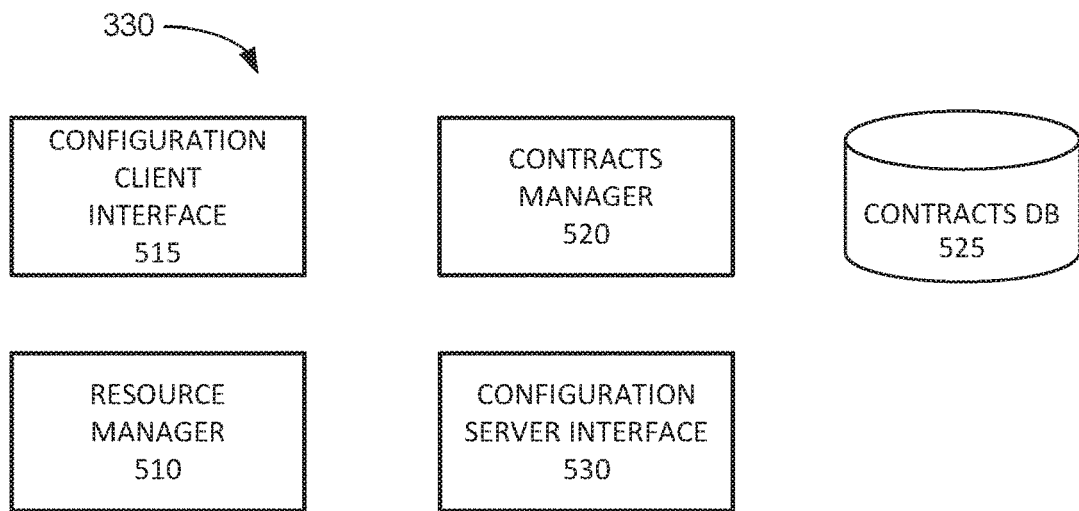
FIG. 5A is a diagram illustrating exemplary functional components of the central application programming interface engine of FIG. 3A according to one embodiment.

FIG. 5A is a diagram illustrating exemplary functional components of central API engine 330. The functional components of central API engine 330 shown in FIG. 5A may be implemented, for example, via processor 214 executing instructions from memory 216. Alternatively, some or all of the components of central API engine 330 may be implemented via hard-wired circuitry. As shown in FIG. 5A, central API engine 330 may include a resource manager 510, a configuration client interface 515, a contracts manager 520, a contract DB 525, and a configuration server interface 530.

Resource manager 510 may manage resources, domain objects, and domain object handlers associated with controller 210. For example, resource manager 510 may detect link selectors in a resource record 402 using a link selector detector. The link selector detector may access a resource record 402 when a new resource is modified and detect a link selector based on a particular link selector field identifier.

Resource manager 510 may perform CRUD operations on resources by instructing configuration server 340 to update domain objects DB 345. Resource manager 510 may receive CRUD requests via, for example, configuration client interface 5150. Configuration client interface 515 may interface with a configuration client in administration device 130, another system unit 115, and/or another type of device. In one embodiment, the configuration client may include a thin client that does not store state information associated with system 115, such as a web interface. Alternatively, the configuration client may implement a "thick" client that stores state information associated with system unit 115.

Contracts manager 520 may monitor contracts associated with a resource and may store information relating to resource contracts in contract DB 525. Exemplary information that may be stored in contract DB 525 is described below with reference to FIG. 5B. Contracts manager 525 may identify contracts associated with a resource based on, for example, contracts field 420 of resource record 402 associated with a domain object. Contracts manager 520 may detect a link selector in a resource record 402 associated with a domain object, based on, for example, a link selector field identifier. Contracts manager 520 may then determine, based on the contracts associated with an interface of a target resource specified in a link selector, whether the target resource is available to form a contract with the client domain object that includes the link selector. If the target resource is not available and the link selector cannot be implemented, contracts manager 520 may generate an error message and send the error message to administration device 130, indicating that a link selector associated with the client domain object cannot be realized. If the target resource is available to form a contract based on the identified link selector, contracts manager 520 may generate a contract between the client domain object that includes the link selector and the server resource specified as the target resource in the link selector. Contracts manager 520 may store information relating to the generated contract in contract DB 525 and/or in resource records 402 associated with the client domain object and the server resource.

Configuration server interface 530 may interface with configuration server 340. For example, configuration server interface 530 may send instructions to configuration server 340 to update a particular resource record 402 in domain objects DB 345 based on a CRUD request received, and approved, by central API engine 330. Configuration server interface 530 may instruct link manager 350 to implement a link based on a detected link selector, if contracts manager 520 generates a new contract based on a link selector and resource manager 510 selects to implement a link based on the link selector and contract. After generating a link, link manager 350 may provide information relating to the generated link to contracts manager 520 via configuration server interface 530. Configuration server interface 530 may instruct link manager 350 to implement a link based on the detected link selector, if contracts manager 520 generates a new contract based on a link selector. After generating a link, link manager 350 may provide information relating to the generated link to contracts manager 520.

Although FIG. 5A shows exemplary functional components of central API engine 330, in other implementations, central API engine 330 may include fewer functional components, different functional components, differently arranged functional components, or additional functional components than depicted in FIG. 5A. Additionally, any one of the components (or any group of components) of central API engine 330 may perform functions described as performed by one or more other functional components of central API engine 330.

Figure 5B:
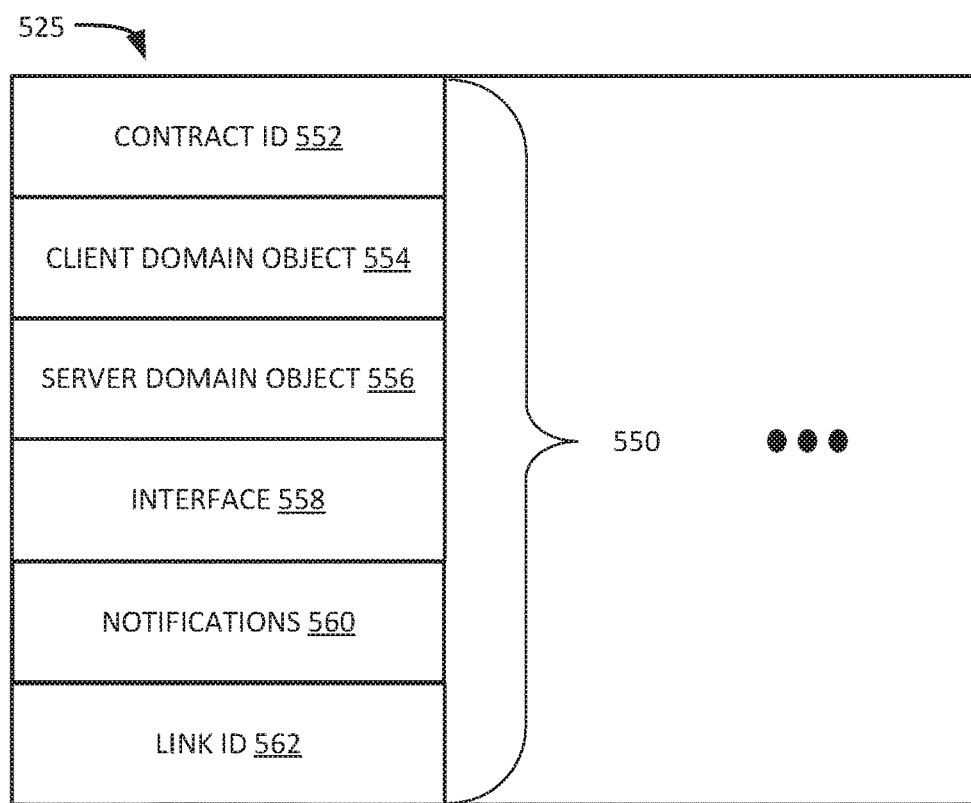
FIG. 5B is a diagram illustrating exemplary information that may be stored in the contracts database of FIG. 5A according to one embodiment.

FIG. 5B is a diagram illustrating exemplary information that may be stored in contract DB 530. As shown in FIG. 5B, contract DB 530 may include one or more contract records 550. Each contract record 550 may store information relating to a particular contract between two resources. In one embodiment, a contract may have two parts (e.g., two contract records 550): one for each party to the contract and each party may be associated with one of the parts. Contract record 550 may include a contract ID field 552, a client domain object field 554, a server domain object field 556, an interface field 558, a notifications field 560, and a link ID field 562. In one embodiment, contract record 550 may also include a field that specifies whether the contract is an exclusive type or a non-exclusive type.

Contract ID field 552 may include an identifier that identifies a particular contract. If the contract has been executed, then each of the two parts of the contract may be associated with the same identifier in contract ID field 552, for example. The contract ID may be generated when the contract is executed and may be unique (e.g., a UUID).

Client domain object ID field 554 and server domain object ID field 556 together may identify the parties (e.g., the resources) to corresponding contract. Client domain object ID field 554 may identify the client domain object ID associated with the particular contract (e.g., as stored in the corresponding resource ID field 408). Server domain object ID field 556 may identify the server domain object ID associated with the particular contract (e.g., as stored in the corresponding resource ID field 408).

Interface field 558 may identify an interface (or a type of interface) associated with the contract. Interface field 558 may identify the interface by reference to an API in interface field 416 of resource record 402 associated with the server domain object identified in server domain object ID field 556. When central API engine 330 determines whether a resource can fulfill a contract, central API engine 330 may determine whether the interface specified in interface field 558 is capable of fulfilling the interface requested by the client domain object.

Notifications field 560 may store information relating to any notifications that are to be sent from the server domain object to the client domain object. For example, the client domain object may subscribe to notifications relating to a particular event associated with the server domain object. Link ID field 562 may identify a link established by link manager 350 between the client domain object and the server domain object.

Although FIG. 5B show exemplary components that may be stored in contract DB 525, in other implementations, contract DB 525 may include fewer components, different components, differently arranged components, or additional components than depicted in FIG. 5B. For example, client domain objectID field 554 and server domain object ID field 556 may be labeled first-party ID field and second-party ID field. As another example, contract DB 525 may include an executed field that includes a Boolean value indicating whether the contract has been executed (e.g., agreed upon by the two parties).

Figure 6A:
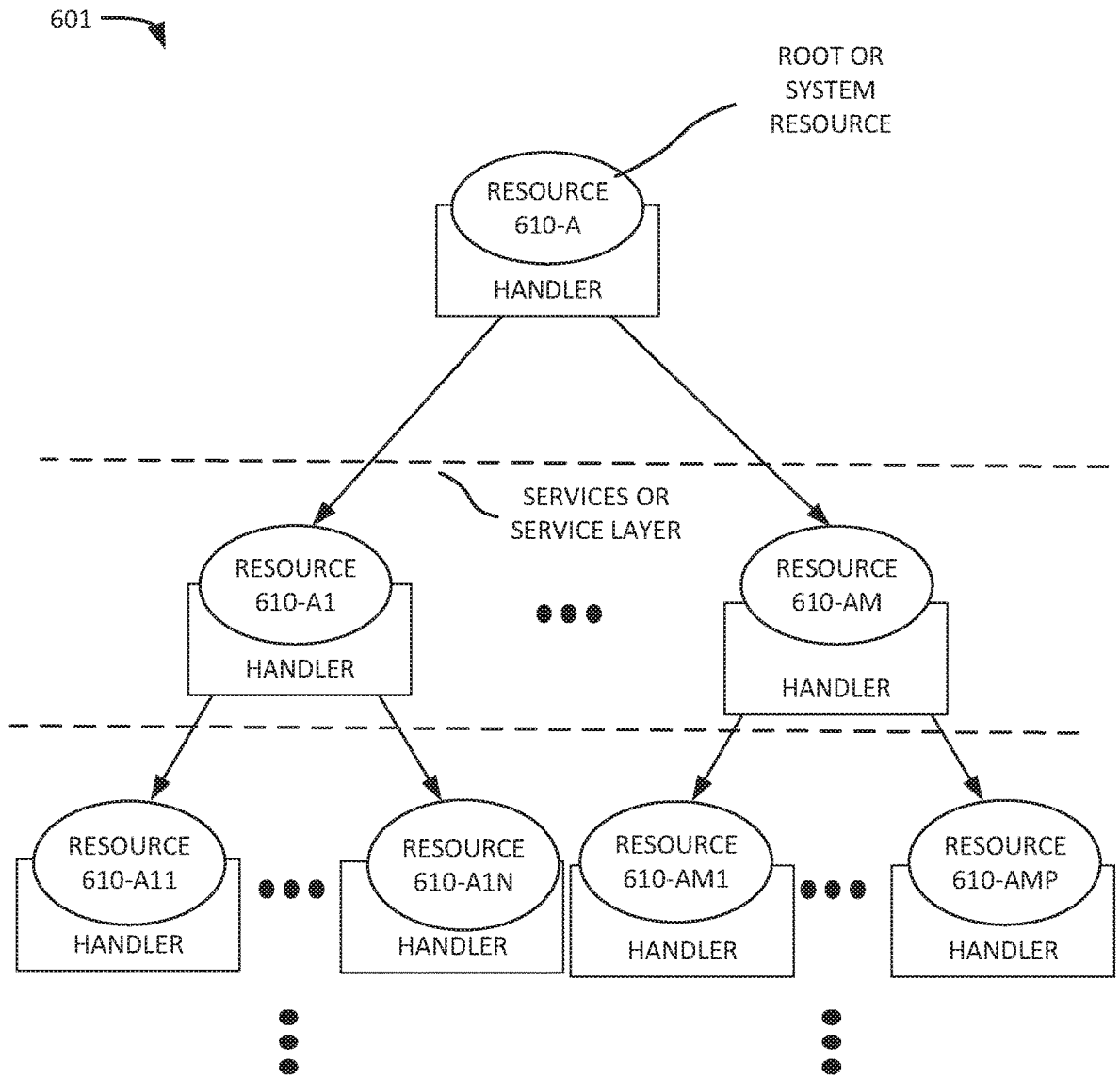
FIG. 6A is a diagram illustrating an exemplary view of resources managed by controller device according to an embodiment.

FIG. 6A is a diagram illustrating an exemplary view 601 of resources managed by controller device 210 (e.g., as perceived by an external client such as administration device 130). View 601 is similar to configuration 377 (FIG. 3B) but with the omission of interfaces for simplicity and ease of understanding. View 601 shows resources 610 in a hierarchical tree in which the corresponding domain object handler 360 (each referred to as "handler" for simplicity in FIG. 6A) may include one or more links to one or more other resources (e.g., through interfaces which are not shown). For example, the handler of a root resource 610-A links to each of resources 610-A1 to 610-AM, the handler of resource 610-A1 links to each of resources 610-A11 to 610-A1N, the handler of resource 610-AM links to each of resources 610-AM1 to 610-AMP (e.g., where M, N, and P are integers), and so on. As noted above, each link from a handler to a resource passes through an interface (not shown). Each link may also be generated based on a link selector and may identify the resource as the target resource of the link selector. In some instances, a handler may not link to any resources.

Resources may be addressed by a handle or pointer. For example, the handle or pointer to resource 610-AMP may be written as resource_610-A/resource_610-AM/resource_610-AMP. The top resource may be referred to as the root or system resource and may be omitted from the handle or pointer for convenience.

As discussed, a resource is provided by the service of a domain object handler 360. In some cases, a single domain object handler 360 may provide the services of multiple resources. A domain object handler 360 may act as a client and request the services of a resource provided by another domain object handler (acting as a server) through an interface.

Figure 6B:
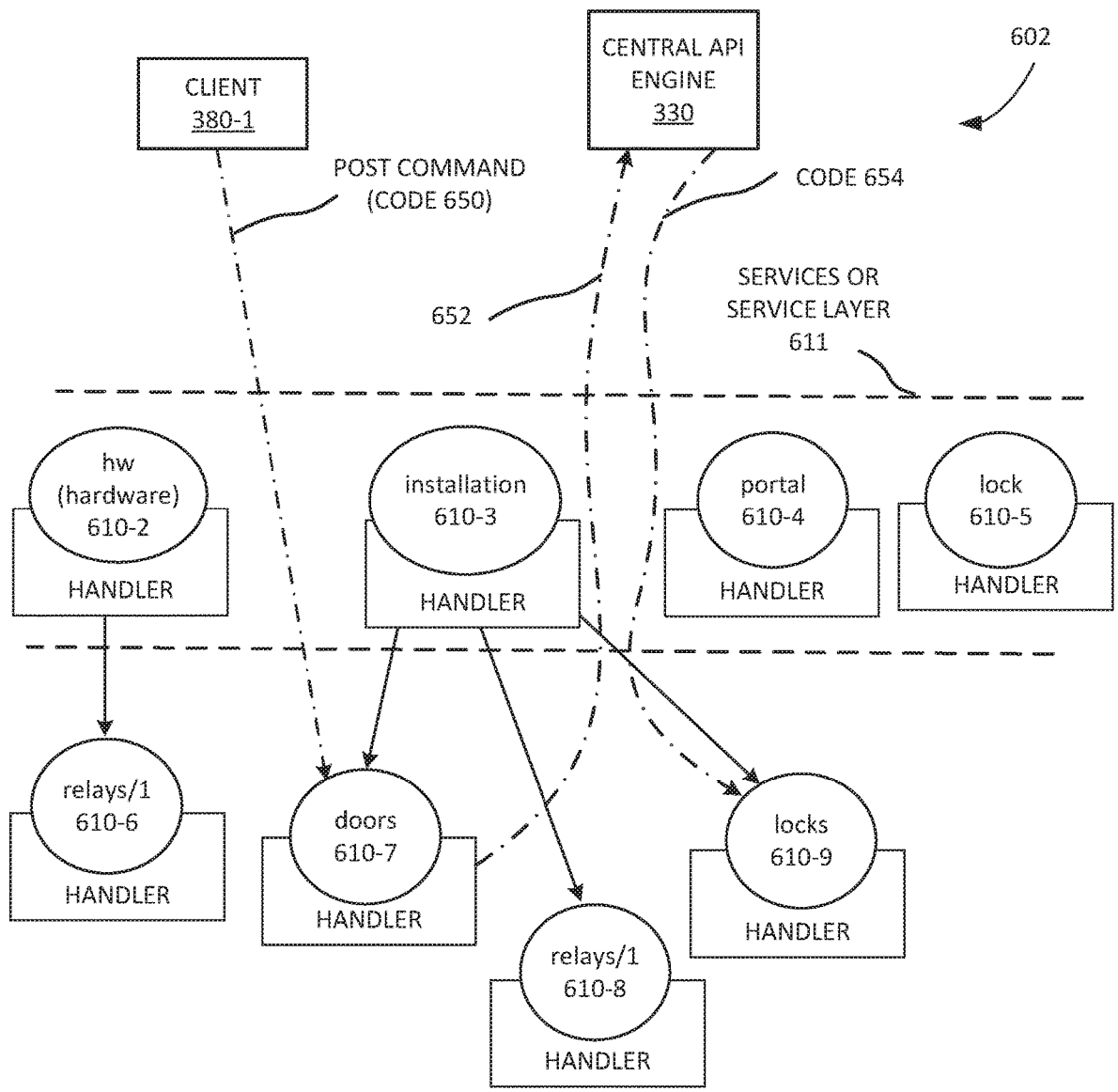
FIG. 6B is a diagram of an exemplary view of resources in a control system for a door with a lock employing a relay according to an embodiment.

FIG. 6B is a diagram of an exemplary view 602 of resources in a control system for a door with a lock employing a relay. View 602 omits the root or system resource for ease of understanding. View 602 may be, for example, how resources are presented (e.g., logically and/or graphically) to a software client in administration device 130 for an administrator to understand and configure the control system. Resources 610 shown in FIG. 6B included in service layer 611 are: hw (or "hardware") service 610-2, installation service 610-3, portal service 610-4, and locks service 610-5. Other resources 610 may include hardware/relays/1 610-6, installation/doors 610-7, installation/relays/1 610-8, and installation/locks 610-9. These resources 610 may also be expressed as resource relays/1 610-6 in the hardware service 610-2, for example.

Figure 6D:
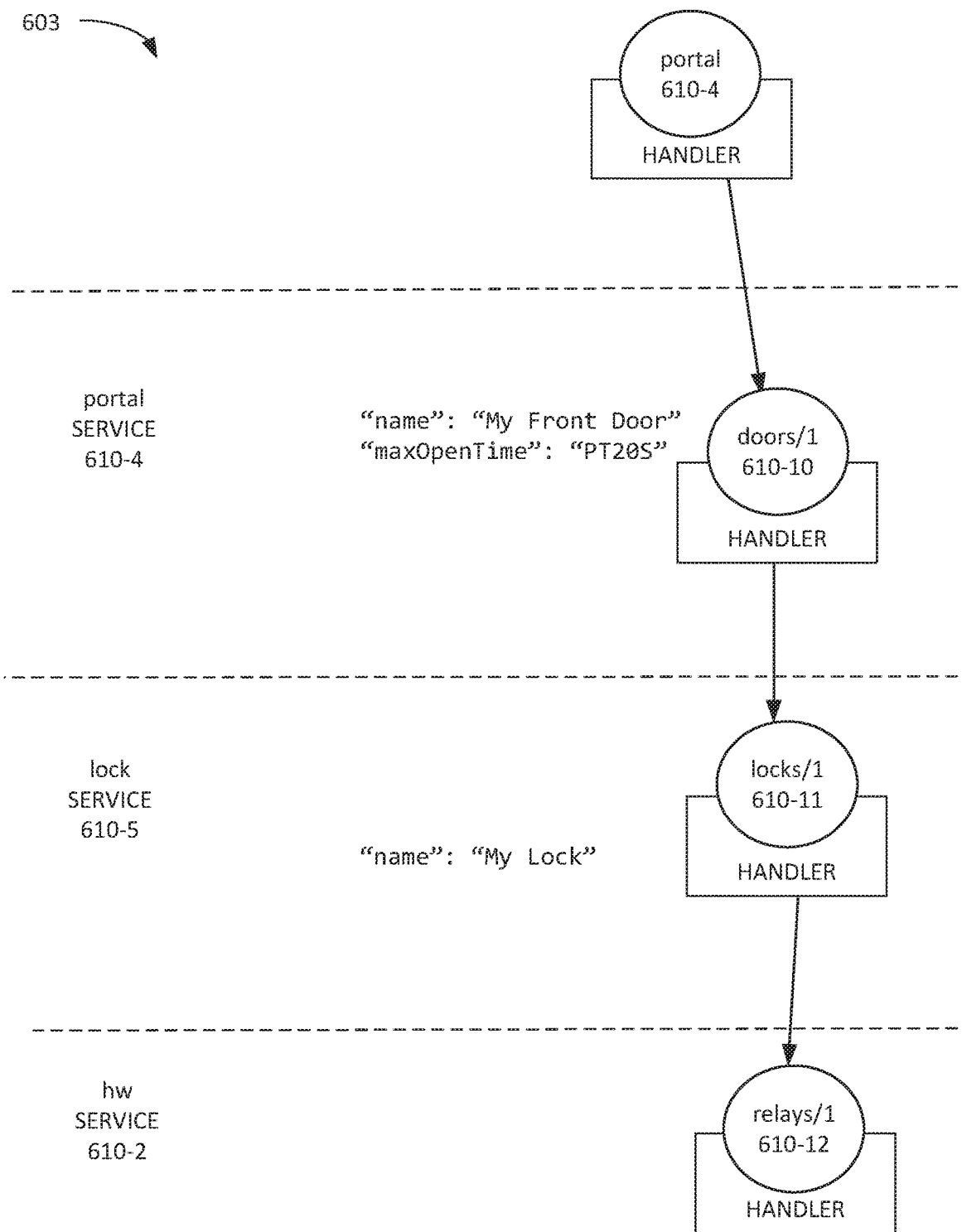
FIG. 6D is a diagram of the resources of FIG. 6B configured based on the code of FIG. 6C according to an embodiment.

Resources 610 may be created, removed, and/or configured by clients (e.g., client software in administration device 130 and/or handlers). FIG. 6C includes an example of code 650 to configure resources from the configuration shown in view 602 to configuration shown in view 603 (shown in FIG. 6D). In the following example, code 650 is passed to the handler for installation/doors resource 610-7 in a POST command (e.g., from client software in administration device 130). The handler for installation/doors resource 610-7 interprets code 650 and configures handlers to expose interfaces associated with resources as shown in view 603 (see FIG. 6D), as described below.

The handler for installation/doors resource 610-7 interprets code 650. In doing so, the handler for installation/doors resource 610-7 creates and configures an instance of a door resource (portal/doors/1 610-10 in FIG. 6D) such that a configuration interface and an operational interface associated with portal/doors/1 resource 610-10 is exposed to the handler of portal service 610-4. The new instance of the door resource (e.g., portal/door/1 610-10) is given the name "My Front Door" and a maximum open time of 20 seconds (e.g., before sounding an alarm) (see FIG. 6D). The handler for installation/doors resource 610-7 recognizes the "myLock" attribute and passes its value (e.g., link selector 652) to central API engine 330. Central API engine 330 continues in a recursive fashion and is tasked with configuring handler(s) to expose interface(s) for providing resource(s) in a service according to requirements posed by requesting handler (e.g., a link selector) and returning the appropriate information to the requesting handler.

With respect to link selector 652, the "private" value for the "type" attribute indicates that an instance of a lock should be created. In addition, the "private" type may indicate that the configuration interface to the new lock instance should be claimed (e.g., exclusively and/or by using a contract) by the handler for portal/doors/1 610-10. The handler for resource installation/locks 610-9 receives a command (e.g., code 654) for the creation and configuration of the new instance of a lock resource (e.g., locks/1 610-11 in the locks service 610-5) such that the configuration interface and an operational interface associated with locks/1 resource 610-11 is exposed to the handler for portal/ doors/1 610-10. The handler for resource installation/locks resource 610-9 provides the name "My lock" for the resource locks/1 610-11 in the locks service 610-5 (as indicated in code 654). Further, the handler for installation/locks resource 610-9 recognizes the "myOutput" attribute and passes its value (e.g., link selector 656) to central API engine 330. Central API engine 330 continues in a recursive fashion and is tasked with configuring handler(s) to expose interface(s) for providing resource(s) in a service according to requirements posed by requesting handler (e.g., a link selector) and returning the appropriate information to the requesting handler.

With respect to link selector 656, the "use" value for the "type" attribute indicates that a relays instance exists for use. Central API engine 330 then configures the handler for hw/relays/1 610-6 such that the configuration interface associated with hw/relays/1 resource 610-6 is exposed to the handler for locks/1 in the locks service 610-5.

Assuming that there are no errors with respect to the interpretation and implementation of code 650, central API engine 330 returns configuration information for the resource hw/relays/1 610-6 to the handler for installation/locks 610-9; and the configuration information for the resource locks/locks/1 610-11 to the handler for installation/doors.

Figure 7:
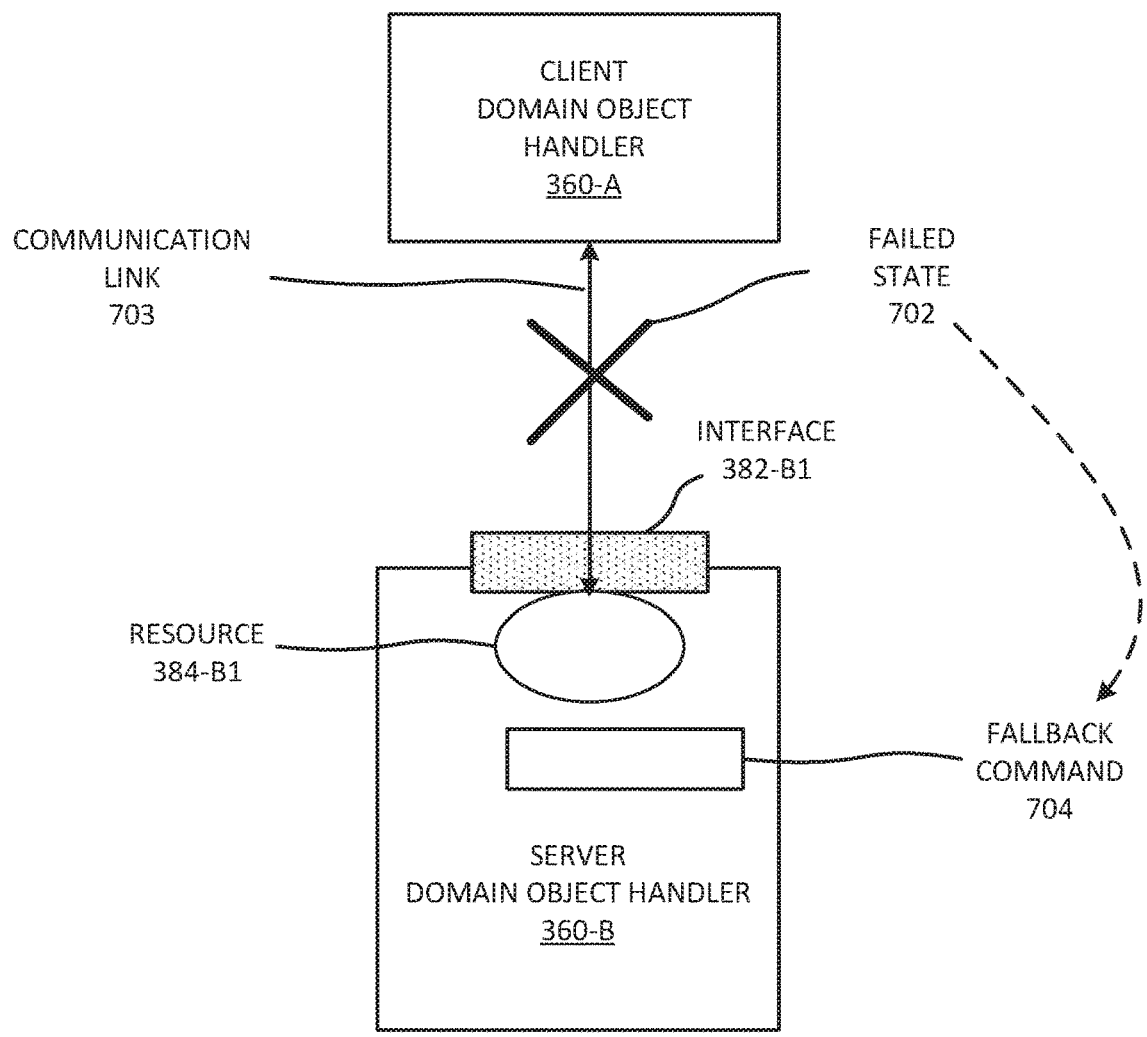
FIG. 7 is a block diagram of a configuration of a client domain object handler and a server domain object handler in one embodiment.

As noted above, resource record 402 in a domain object 400 may store a fallback command in fallback command field 430. The fallback command is a command that the associated handler 360 may execute when the associated interface is no longer in communication with its client. FIG. 7 is a block diagram of a configuration 700, which is simplified relative to configuration 377 (FIG. 3B). As shown with configuration 700, when the communication link 703 is in a failed state 702 between client handler 360-A and resource 384-131 provided by handler 360-B through interface 382-131, handler 360-B executes fallback command 704 (e.g., stored in fallback command field 430). Fallback command 704 may have been received from client handler 360-A in server handler 360-B before communication link 703 is in a failed state 702. Indeed, client handler 360-A may have its own fallback command (not shown) that it used (in conjunction with other logic stored in functions field 426) as a basis to generate fallback command 704 to transmit to server handler 360-B (acting on behalf of resource 384-131). In one embodiment, communication link 703 may fail when a process in client handler 360-A or server handler 360-B crashes and/or when a communication line between handler 360-A and 360-B is physically broken.

Figure 8:
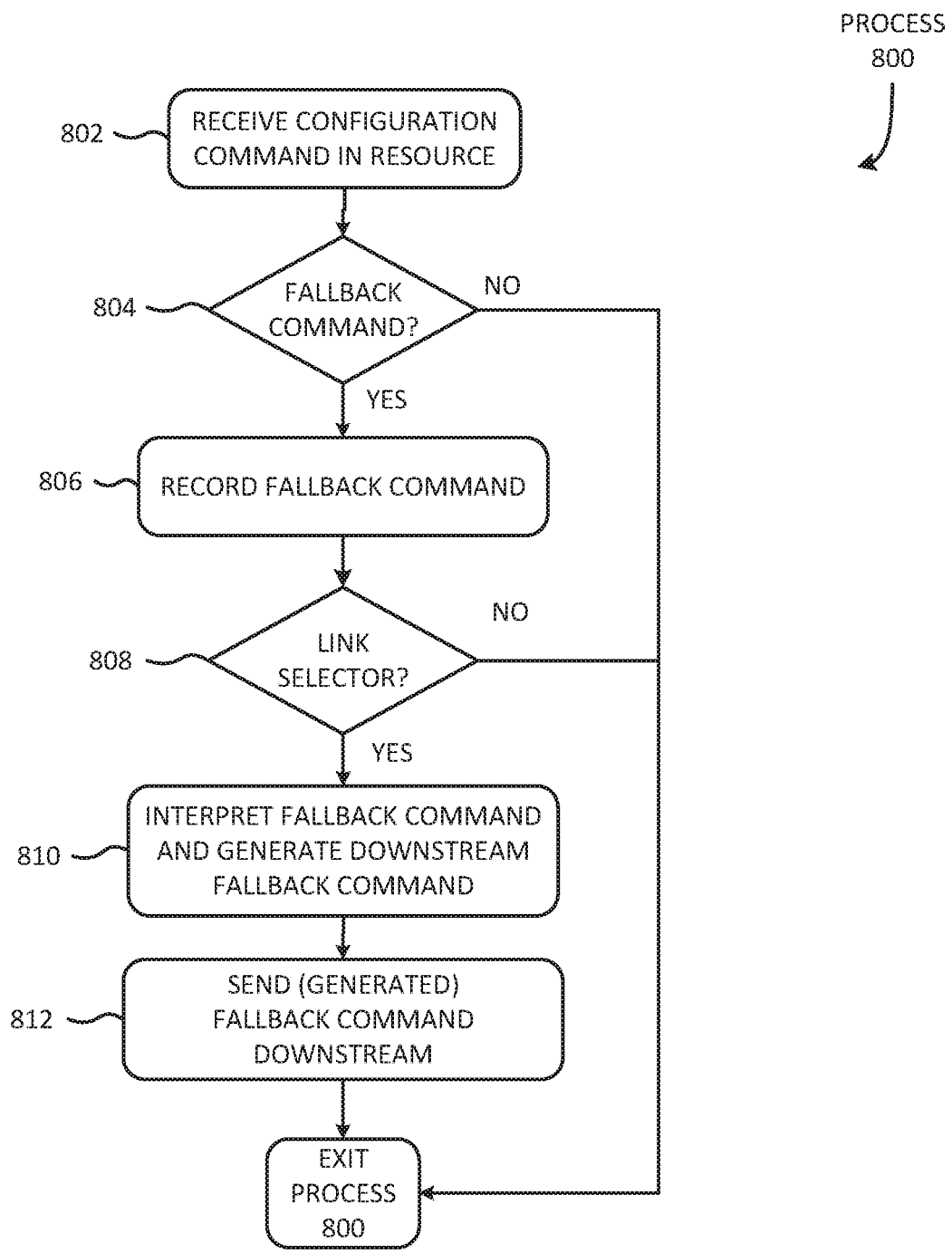
FIG. 8 is a flowchart for a process to configure a fallback command in a control system.
Figure 9A:
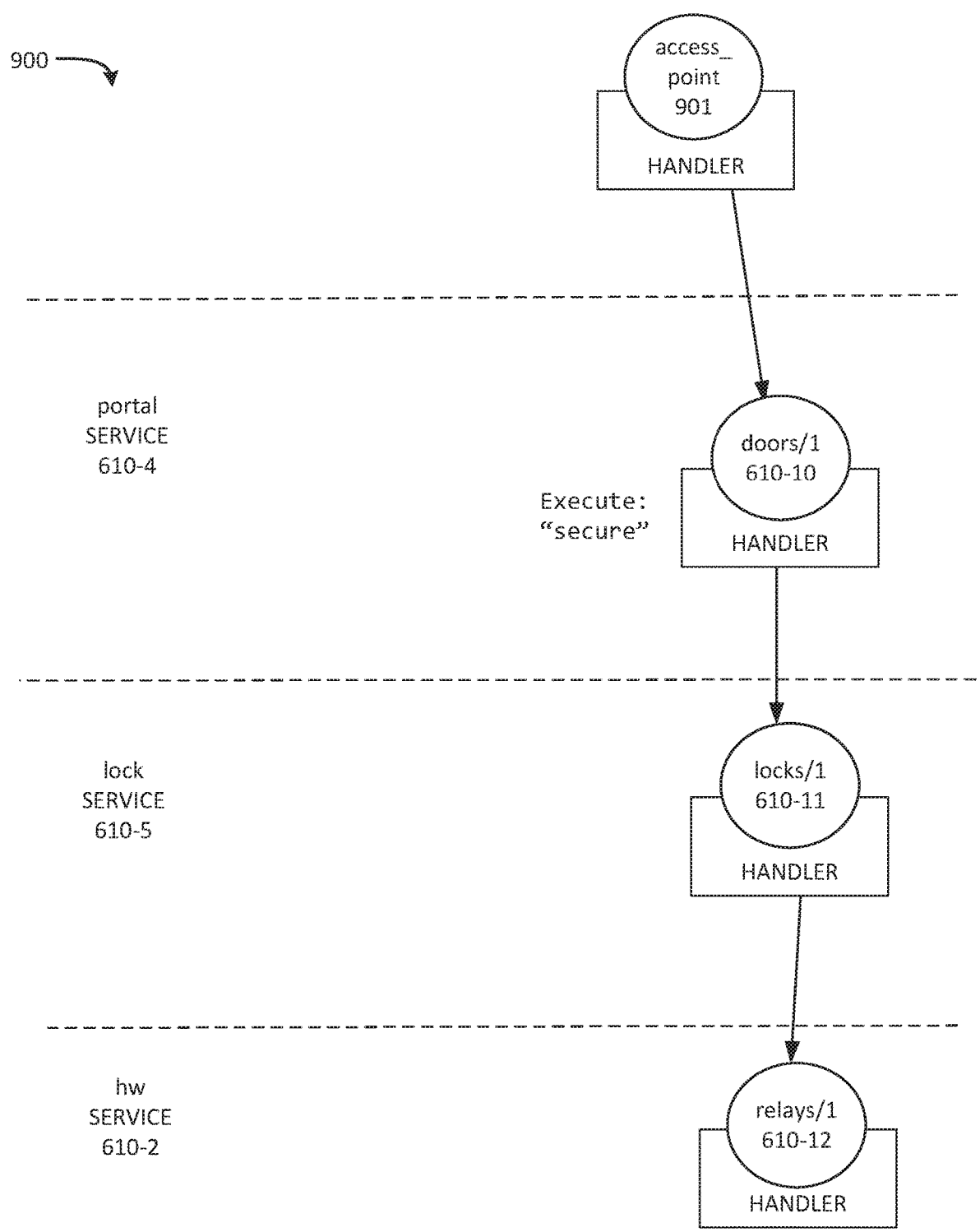
FIG. 9A is a block diagrams of an exemplary configuration for propagating a fallback command in a control system in one embodiment.

FIG. 8 is a flowchart of a process 800 for storing (e.g., buffered) fallback command in a modular control system in one embodiment. Process 800 may be performed by processor 214 in controller 210 reading instructions from memory 216 to execute. Process 800 is described with respect to FIGS. 9A and 9B. FIG. 9A is a block diagram of a configuration 900 that is similar to the configuration 603 (shown in FIG. 6D). As compared to configuration 603, configuration 900 shows an exemplary operational configuration in which a handler with an access_point resource 901 is the client to doors/1 resource 610-10. That is, the handler for doors/1 resource 610-10 exposes its operational interface to the handler for access_point resource 901.

In the following example, code 902 may be passed, for example, to the handler for access_point resource 901. Code 902 includes a "messageType" attribute with a "request" value, and a "request" type with a value indicating that the request type is a command associated with the portal/doors/1 resource 610-10. Code 902 instructs a command to be passed to portal/doors/1 resource 610-10 through an operational interface named "portal-op" (e.g., in a POST command or via another type of message). The handler for portal/doors/1 resource 610-10 receives the command (block 802) through its operational interface (e.g., named "portal-op").

In this example, code 902 includes a fallback command (specified in the "command" attribute) for configuring the portal/doors/1 resource 610-10. The client that owns the operational interface (e.g., the handler for access_point resource 901) to the target portal/doors/1 resource 610-10 (e.g., as specified in a contract) is able to send the command through the operational interface (e.g., using an operational API) to the portal/doors/1 resource 610-10 that instructs the portal/doors/1 610-10 resource to execute a fallback command (e.g., "makeSecure" as shown in code 902) under the proper conditions (e.g., loss of communication). The semantic interpretation of the "makeSecure" command in this example is to cause the physical door associated with the control system to enter a secure state (e.g., to lock physically to keep a protected area secure). A "makeSecure" command may be beneficial, for example, in a control system for a door to a bank vault when it looses its connection to its controller. On the other hand, the semantic interpretation of a "grantAccess" command is to cause the physical door associated with the control system to unlock or enter a not secure state (e.g., not physically locked).

The handler for portal/doors/1 resource 610-4 receives the command through the corresponding operational interface (block 802). If there is a fallback command in the operational command (block 804: YES), then the fallback command is recorded in the domain object 400 and/or resource record 402 corresponding to the portal/doors/1 resource 610-10 (e.g., in fallback command field 430). The handler corresponding to the portal/doors/1 resource 610-10 (and/or central API engine 330) determines if there is downstream a link selector (block 808) for which a downstream fallback command should be generated. If so (block 808: YES), then the handler for portal/doors/1 resource 610-10 generates a downstream fallback command (block 809).

In this example, the handler for portal/doors/1 resource 610-10 (and/or central API engine 330) determines that the link selector pointing to lock/locks/1 resource 610-11 requires its own fallback command for the intent of the initial fallback command (e.g., "makeSecure") to be carried out in case of a failure. Here, the "intent of the initial fallback command" means, for example, an interpreter generating another command for a downstream handler to carry out the semantic interpretation of the original fallback command (e.g., "makeSecure"). Thus, the handler for portal/doors/1 610-10 generates the following fallback command to send downstream: "lock". In other words, because the semantic interpretation of the "makeSecure" command is to cause the physical door to be physically locked, the fallback command for lock/locks/1 resource 610-11 to carry out this semantic interpretation under the appropriate circumstances would be to execute a "lock" command.

If the original fallback command was instead "grantAccess" (or "makeNotSecure") (rather than "makeSecure"), then the handler for portal/doors/1 610-10 may instead generate the following fallback command to send downstream: "unlock". In other words, because the semantic interpretation of a "grantAccess" command is to cause the physical door to be unlocked, the fallback command for lock/locks/1 resource 610-11 to carry out this semantic interpretation under the appropriate circumstances would be to execute an "unlock" command. In one embodiment, a domain object may store a mapping (e.g., a table) of a fallback command for the instant resource to a fallback command for the downstream resource. As another example, if the original fallback command was "grantAccess" and the physical door was a sliding door, then the fallback command to send downstream may be "slideOpen".

The handler may send the generated fallback command downstream (block 812). As discussed below, another instance of process 800 may be instantiated (e.g., in a recursive fashion) by the handler associated with the downstream resource (e.g., the handler for lock/locks/1 resource 610-11), when the downstream resource receives the operational command with a fallback command. In the current example, the handler for portal/doors/1 610-10 owns the operational interface for the resource lock/locks/1 610-11 and sends (block 812) an operational command to it (e.g., using an operational API) through the operational interface with the generated fallback command (e.g., "lock").

As noted, another instance of process 800 may be instantiated (e.g., in a recursive fashion) when a downstream resource receives an operational command (e.g., starting at block 802). In the current example, the handler for resource lock/locks/1 610-11 receives the operational command (e.g., through an operational interface) with a fallback command (block 804: YES) (e.g., "lock"). The handler for lock/locks/1 610-11 records the fallback command (e.g., "lock") in the corresponding domain object (e.g., in fallback command field 430) for execution under the appropriate circumstances (e.g., communication failure). The handler for lock/locks/1 resource 610-11 (and/or central API engine 330) determines that the link selector pointing to hw/relays/1 resource 610-12 requires its own fallback command for the intent of the initial fallback command (e.g., "makeSecure" or "lock") to be carried out in case of a failure. Thus, the handler for lock/locks/1 resource 610-11 generates the following fallback command to send downstream: "activate". In other words, because the semantic interpretation of the "makeSecure" or "lock" command is to cause the physical door to be physically locked, the fallback command for hw/relays/1 resource 610-12 to carry out this semantic interpretation under the appropriate circumstances would be to execute an "activate" command.

If the original fallback command was instead "grantAccess" (rather than "makeSecure"), then the handler for lock/locks/1 610-11 may instead generate the following fallback command to send downstream: "deactivate". In other words, because the semantic interpretation of the "grantAccess" (or "unlock" command) is to cause the physical door to be physically unlocked, the fallback command for hw/relays/1 resource 610-12 to carry out this semantic interpretation under the appropriate circumstances would be to execute a "deactivate" command. If the fallback command was instead "grantAccess" (rather than "makeSecure"), and the door was a sliding door, then the generated fallback command may be "slideOpen".

The handler may send the generated fallback command downstream (block 812). In the current example, the handler for lock/locks/1 610-11 owns the operational interface (e.g., specified by a contract) for the resource hw/relays/1 610-12 and sends (block 812) an operational command to it with the generated fallback command (e.g., "activate").

In the current example, yet another instance of process 800 is instantiated (e.g., in a recursive fashion) when a downstream resource (e.g., resource hw/relays/1 610-12) receives the operational command (e.g., starting at block 802). Thus, the handler for resource hw/relays/1 610-12 receives the operational command (block 802) with a fallback command (block 804: YES) (e.g., "activate"). The handler for lock/locks/1 610-11 records the fallback command (e.g., "activate") in the corresponding domain object (e.g., in fallback command field 430) for execution under the appropriate circumstances (e.g., communication failure). The handler for hw/relays/1 resource 610-12 determines that there is no link selector pointing to another resource (block 808: NO) and sends an acknowledgement upstream to the client handler (block 816).

Figures 9B, 10:
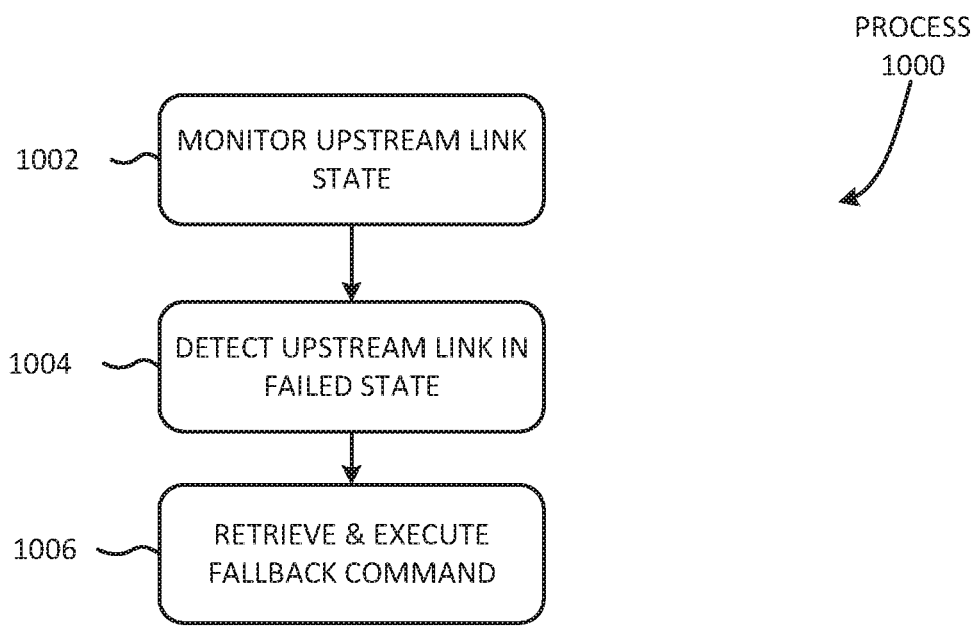
FIG. 9B is a diagram of exemplary configuration code to configure a fallback command in a control system in one embodiment.
FIG. 10 is a flowchart of a process to execute a fallback command in a control system in one embodiment.

As shown, process 800 receives a fallback command associated with a resource and propagates the appropriate fallback command to downstream resources. As noted above, a fallback command may be executed under the appropriate circumstances, such as when a communication link is down. FIG. 10 is a flowchart of a process 1000 detecting broken links to interfaces and executing fallback commands. Process 1000 may be performed by processor 214 in controller 210 reading instructions from memory 216 to execute. FIG. 10 is described with respect to the failure condition shown in FIGS. 11A through 11C. In other implementations, some or all of process 1000 may be performed by another device or a group of devices separate from controller 210 and/or including controller 210.

In particular, process 1000 may be performed by each domain object handler 360 associated with a resource and an interface that is configured to receive communications. Process 1000 may begin by monitoring an upstream communication link associated with an interface to determine whether it has failed or is in a failed state (block 1002). In one embodiment, determining that the upstream link associated with the interface is in a failed state includes determining that a process associated with the upstream link is not running (e.g., a process in the client or server handler). In another embodiment, determining that the upstream link associated with the interface is in a failed state includes determining that a communication channel is not passing (e.g., transmitting and/or receiving) data. In yet another embodiment, determining that the upstream link associated with the interface is in the failed state includes determining that a heartbeat message has not been received within a specified time period.

Figure 11A:
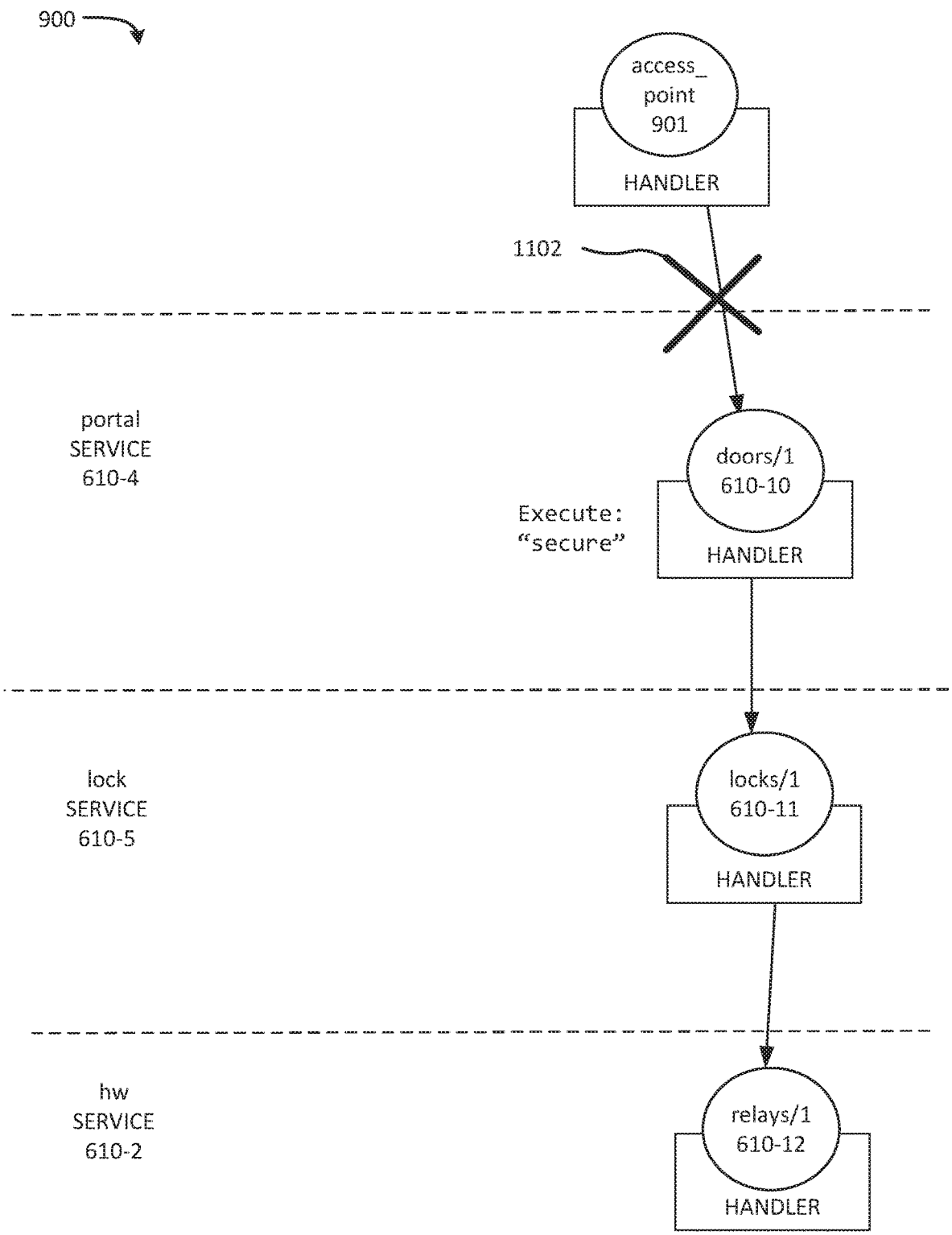
FIGS. 11A, 11B, and 11C are block diagrams of an exemplary configuration for processing a fallback command in a control system in which fallback commands are executed in one embodiment.
Figure 11B:
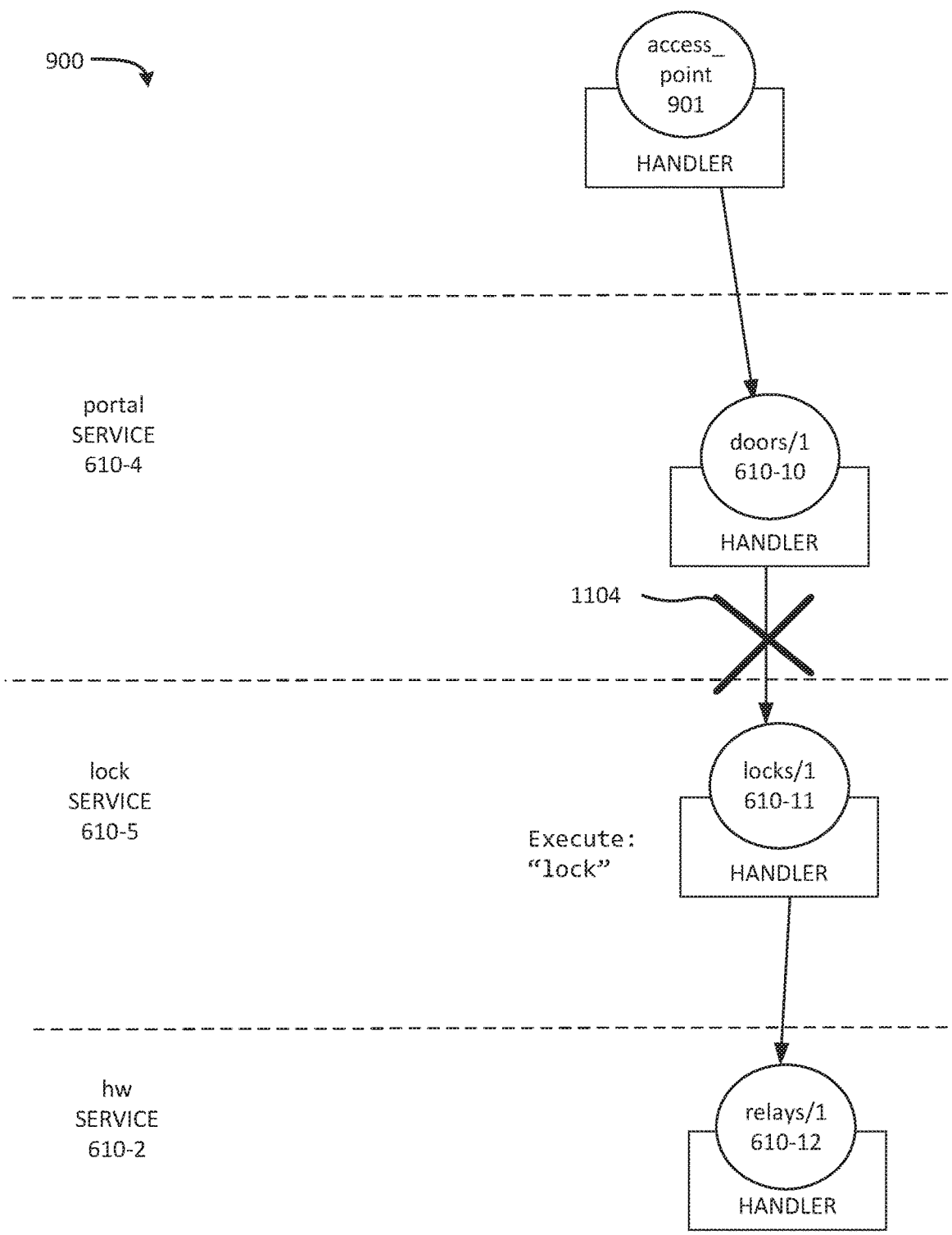
Figure 11C:
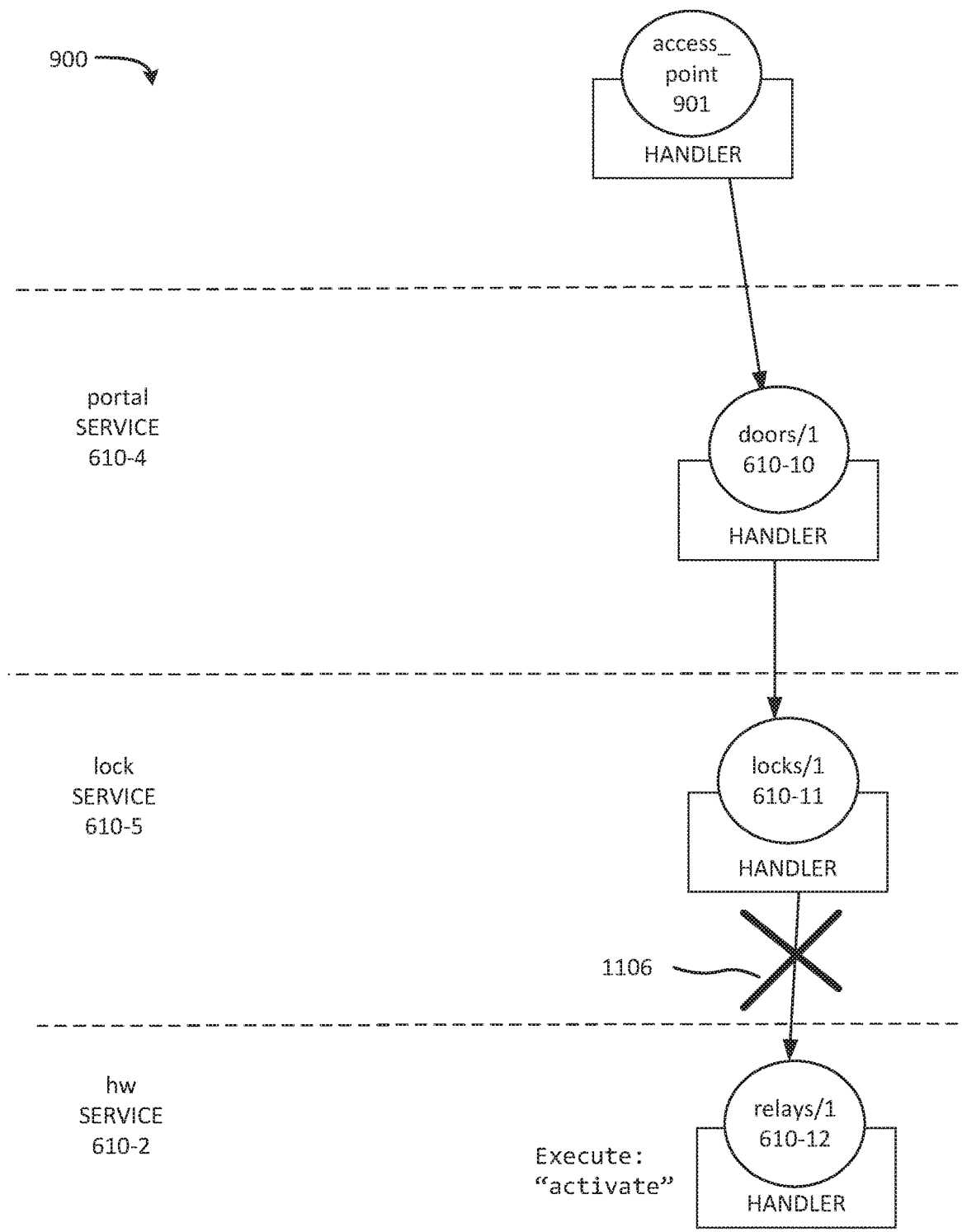

FIG. 11A shows, for example, a failed state 1102 in the communication link between the handler for the access_point resource 901 and the portal/doors/1 resource 610-10. FIG. 11C shows a failure 1104 in the communication link between the handler for the portals service 610-4 and the portal/doors/1 resource 610-10. FIG. 11C shows a failure 1106 in the communication link between the handler for the portals service 610-4 and the portal/doors/1 resource 610-10.

If the upstream link has failed (block 1004), then the fallback command is executed (block 1006). For example, if failure 1102 is present between the handler for access_point resource 901 610-4 and portal/doors/1 resource 610-10 (block 1004), then the handler for portal/doors/1 610-10 executes "makeSecure." When the handler for portal/doors/1 610-10 executes "makeSecure", it may transmit a "lock" command to lock/locks/1 resource 610-11 (e.g., through the operational interface to which it has a contract). When the lock/locks/1 resource 610-11 receives the "lock" command, it may issue a "activate" command to hw/relays/1 resource 610-12 (e.g., through the operational interface it has a contract).

As another example, if failure 1104 is present between portal/doors/1 resource 610-10 and lock/locks/1 resource 610-11 (block 1004), then the handler for lock/locks/1 610-11 executes "lock". When the handler for lock/locks/1

610-11 executes "lock", it may transmit a "activate" command to hw/relays/1 resource 610-12 (e.g., through the operational interface it owns).

As yet another example, if failure 1106 is present between lock/locks/1 resource 610-11 and hw/relays/1 resource 610-12 (block 1004), then the handler for hw/relays/1 resource 610-12 executes "activate".

This application incorporates by reference the following applications filed the same day as the present patent application: Attorney Docket No. P190054US01 (0090-0026), titled "Modular Control System"; Attorney Docket No. P190060US01 (0090-0027), titled "Link Selector in a Modular Control System"; Attorney Docket No. P190057US01 (0090-0028), titled "Dynamic Transport Setup in a Modular Control System"; and Attorney Docket No. P190056US01 (0090-0030), titled "Resource View in Modular Control System".

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to the figures with flowcharts, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises" or "comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

The invention claimed is:

1. A method, performed by a computer device, the method comprising:

identifying, by the computer device, a first resource, wherein the first resource enables access to a first domain object handler that corresponds to a logical entity that controls a second resource;

identifying, by the computer device, a first domain object for the first resource in a domain object database, wherein the first domain object maps the first resource to the first domain object handler for the computer device;

identifying, by the computer device, a first interface for the first resource, wherein the first interface specifies one or more first commands associated with the first resource, wherein the first interface is configured to receive the one or more first commands from a client, wherein the first domain object handler provides a service including the first resource to the client and wherein the client controls the first resource;

receiving, by the computer device, a first fallback command associated with the first interface for the first resource, wherein the first domain object handler is configured to execute the first fallback command when determined that the first domain object handler is no longer in communication with the client through the first interface;

storing, by the computer device, the first fallback command in the first domain object for the first resource associated with the first interface;

receiving, from the client through the first interface, the one or more first commands associated with the first resource;

processing, by the first domain object handler of the computer device, the one or more first commands received through the first interface for the first resource, wherein the processing of the one or more first commands, while the first domain object handler is in communication with the client, causes the first domain object handler to send one or more second commands through a second interface associated with the second resource, wherein a second domain object handler provides a service including the second resource to the first domain object handler and the first domain object handler controls the second resource;

executing, by the first domain object handler of the computer device, the first fallback command when determined that the first domain object handler is no longer in communication with the client through the first interface, wherein the first fallback command, when executed, causes the first domain object handler to send the one or more second commands to the second resource through the second interface while the first domain object handler is no longer in communication with the client through the first interface; and interpreting, by the first domain object handler, the first fallback command and generating a second fallback command that corresponds to carrying out a semantic interpretation of the first fallback command, wherein the second domain object handler is configured to execute the second fallback command when determined that the second domain object handler is no longer in communication with the first domain object handler through the second interface associated with the second resource.

2. The method of claim 1, performed by the computer device, further comprising:

determining that the first domain object handler is no longer in communication with the client through the first interface.

3. The method of claim 2, performed by the computer device, wherein determining that the first domain object handler is no longer in communication with the client through the first interface includes determining that a process associated with the client or associated with the first domain object handler is not running.

4. The method of claim 3, performed by the computer device, wherein the process associated with the client and the process associated with the first domain object handler are in a same device.

5. The method of claim 1, performed by the computer device, further comprising:
sending, by the computer device, the second fallback command associated with the second interface for the second resource to the second domain object handler.

6. The method of claim 1, performed by the computer device, further comprising:
identifying, by the computer device, the second domain object handler associated with the second resource, wherein the second resource enables access to the second domain object handler that corresponds to a logical entity that controls a device or a port, or corresponds to a logical entity that controls another resource;
identifying, by the computer device, a second domain object for the second resource in the domain object database, wherein the second domain object maps the second resource to the second domain object handler for the computer device; and
identifying, by the computer device, the second interface for the second resource, wherein the second interface specifies one or more commands associated with the second resource, wherein the second interface is configured to receive the one or more second commands from the first domain object handler.

7. The method of claim 6, performed by the computer device, further comprising:
receiving, by the computer device, the second fallback command associated with the second interface for the second resource, wherein the second domain object handler is configured to execute the second fallback command when determined that the second domain object handler is no longer in communication with the first domain object handler through the second interface;
storing, by the computer device, the second fallback command in the second domain object associated with the second interface for the second resource; and
processing, by the second domain object handler of the computer device, the one or more second commands received by the resource based on information stored in a resource record.

8. The method of claim 2, performed by the computer device,
wherein the first domain object handler and the second domain object handler are located within a housing of a same device; and
wherein determining that the first domain object handler is no longer in communication with the client through the first interface includes determining that a heartbeat message has not been received by the first domain object handler within a specified period of time.

9. The method of claim 7, performed by the computer device, further comprising:
interpreting, by the second domain object handler, the second fallback command and generating a third fallback command that corresponds to carrying out a semantic interpretation of the second fallback command,
wherein a third domain object handler is configured to execute the third fallback command when determined that the third domain object handler is no longer in communication with the second domain object handler through a third interface associated with the third resource.

10. A device comprising:
a memory to store instructions; and
a processor configured to execute the instructions to:
identify a first resource, wherein the first resource enables access to a first domain object handler that corresponds to a logical entity that controls a second resource;
identify a first domain object for the first resource in a domain object database, wherein the first domain object maps the first resource to the first domain object handler for the device;
identify a first interface for the first resource, wherein the first interface specifies one or more first commands associated with the first resource, wherein the first interface is configured to receive the one or more first commands from a client, wherein the first domain object handler provides a service including the first resource to the client and the client controls the first resource;
receive a first fallback command associated with the first interface for the first resource, wherein the first domain object handler is configured to execute the first fallback command when determined that the first domain object handler is no longer in communication with the client through the first interface;
store the first fallback command in the first domain object for the first resource associated with the first interface;
receive, through the first interface, the one or more first commands associated with the first resource;
process, by the first domain object handler, the one or more first commands received through the first interface for the first resource, wherein the processing of the one or more first commands, while the first domain object handler is in communication with the client, causes the first domain object handler to send one or more second commands through a second interface associated with the second resource, wherein a second domain object handler provides a service including the second resource to the first domain object handler and the first domain object handler controls the second resource;
execute, by the first domain object handler, the first fallback command when determined that the first domain object handler is no longer in communication with the client through the first interface, wherein the first fallback command, when executed, causes the first domain object handler to send the one or more second commands to the second resource through the second interface while the first domain object handler is no longer in communication with the client through the first interface; and
interpret, by the first domain object handler, the first fallback command and generate a second fallback command that corresponds to carrying out a semantic interpretation of the fallback command, wherein the second domain object handler is configured to execute the second fallback command when determined that the second domain object handler is no longer in communication with the first domain object handler through the second interface associated with the second resource.

11. The device of claim 10, wherein the processor is configured to:
   determine that the first domain object handler is no longer in communication with the client through the first interface.

12. The device of claim 11, wherein when the processor determines that the first domain object handler is no longer in communication with the client through the first interface, the processor is configured to determine that a process associated with the client or associated with the first domain object handler is not running.

13. The device of claim 11, wherein the process associated with the client and the process associated with the first domain object handler are in the same device.

14. The device of claim 10, wherein the processor is configured to:
   send the second fallback command associated with the second interface for the second resource to the second domain object handler.

15. The device of claim 10, wherein the processor is configured to:
   identify the second domain object handler associated with the second resource, wherein the second resource enables access to the second domain object handler that corresponds to a logical entity that controls a device or a port, or corresponds to a logical entity that controls another resource;
   identify a second domain object for the second resource in the domain object database, wherein the second domain object maps the second resource to the second domain object handler for the device; and
   identify the second interface for the second resource, wherein the second interface specifies the one or more second commands associated with the second resource, and wherein the second interface is configured to receive the one or more second commands through from the first domain object handler.

16. The device of claim 15, wherein the processor is configured to:
   receive the second fallback command associated with the second interface for the second resource, wherein the second domain object handler is configured to execute the second fallback command;
   store the second fallback command in the second domain object associated with the second interface for the second resource; and
   process, by the second domain object handler, the one or more second commands received by the second resource based on information stored in a resource record.

17. The device of claim 16,
   wherein the first domain object handler and the second domain object handler are located within a housing of a same device, and
   wherein the processor is configured to determine that the first domain object handler is no longer in communication with the client through the first interface by determining that a heartbeat message has not been received by the first domain object handler within a specified period of time.

18. The device of claim 16, wherein the processor is configured to:
   interpret, by the second domain object handler, the second fallback command and generate a third fallback command that corresponds to carrying out a semantic interpretation of the second fallback command,
   wherein a third domain object handler is configured to execute the third fallback command when determined that the third domain object handler is no longer in communication with the second domain object handler through a third interface associated with the third resource.

19. A device comprising:
   a memory to store instructions; and
   a processor configured to execute the instructions to:
      identify a first resource, wherein the first resource enables access to a first domain object handler that corresponds to a logical entity that controls a second resource;
      identify a first domain object for the first resource in a domain object database, wherein the first domain object maps the first resource to the first domain object handler for the device;
      identify a first interface for the first resource, wherein the first interface specifies one or more first commands associated with the first resource, wherein the first interface is configured to receive the one or more first commands from a client, wherein the first domain object handler provides a service including the first resource to the client and the client controls the first resource;
      receive a first fallback command associated with the first interface for the first resource, wherein the first domain object handler is configured to execute the first fallback command when determined that the first domain object handler is no longer in communication with the client through the first interface;
      store the first fallback command in the first domain object for the first resource associated with the first interface;
      receive, through the first interface, the one or more first commands associated with the first resource;
      process, by the first domain object handler, the one or more first commands received through the first interface for the first resource, wherein the processing of the one or more first commands, while the first domain object handler is in communication with the client, causes the first domain object handler to send one or more second commands through a second interface associated with the second resource, wherein a second domain object handler provides a service including the second resource to the first domain object handler and the first domain object handler controls the second resource;
      execute, by the first domain object handler, the first fallback command when determined that the first domain object handler is no longer in communication with the client through the first interface, wherein the first fallback command, when executed, causes the first domain object handler to send the one or more second commands to the second resource through the second interface while the first domain object handler no longer in communication with the client through the first interface;
      identify the second domain object handler associated with the second resource, wherein the second resource enables access to the second domain object handler that corresponds to a logical entity that controls a device or a port, or corresponds to a logical entity that controls another resource;
      identify a second domain object for the second resource in the domain object database, wherein the second domain object maps the second resource to the second domain object handler for the device; and identify the second interface for the second resource, wherein the second interface specifies the one or more second commands associated with the second resource, and wherein the second interface is configured to receive the one or more second commands from the first domain object handler.

20. A method, performed by a computer device, the method comprising:

identifying, by the computer device, a first resource, wherein the first resource enables access to a first domain object handler that corresponds to a logical entity that controls a second resource;

identifying, by the computer device, a first domain object for the first resource in a domain object database, wherein the first domain object maps the first resource to the first domain object handler for the computer device;

identifying, by the computer device, a first interface for the first resource, wherein the first interface specifies one or more first commands associated with the first resource, wherein the first interface is configured to receive the one or more first commands from a client, wherein the first domain object handler provides a service including the first resource to the client and wherein the client controls the first resource;

receiving, by the computer device, a first fallback command associated with the first interface for the first resource, wherein the first domain object handler is configured to execute the first fallback command when determined that the first domain object handler is no longer in communication with the client through the first interface;

storing, by the computer device, the first fallback command in the first domain object for the first resource associated with the first interface;

receiving, from the client through the first interface, the one or more first commands associated with the first resource;

processing, by the first domain object handler of the computer device, the one or more first commands received through the first interface for the first resource, wherein the processing of the one or more first commands, while the first domain object handler is in communication with the client, causes the first domain object handler to send one or more second commands through a second interface associated with the second resource, wherein a second domain object handler provides a service including the second resource to the first domain object handler and the first domain object handler controls the second resource;

executing, by the first domain object handler of the computer device, the first fallback command when determined that the first domain object handler is no longer in communication with the client through the first interface, wherein the first fallback command, when executed, causes the first domain object handler to send the one or more second commands to the second resource through the second interface while the first domain object handler is no longer in communication with the client through the first interface;

identifying, by the computer device, the second domain object handler associated with the second resource, wherein the second resource enables access to the second domain object handler that corresponds to a logical entity that controls a device or a port, or corresponds to a logical entity that controls another resource;

identifying, by the computer device, a second domain object for the second resource in the domain object database, wherein the second domain object maps the second resource to the second domain object handler for the computer device; and identifying, by the computer device, the second interface for the second resource, wherein the second interface specifies one or more commands associated with the second resource, wherein the second interface is configured to receive the one or more second commands from the first domain object handler.

* * * * *

UNITED STATES PATENT AND TRADEMARK OFFICE
CERTIFICATE OF CORRECTION

PATENT NO. : 11,539,642 B2
APPLICATION NO. : 16/731913
DATED : December 27, 2022
INVENTOR(S) : Marcus Johansson et al.

It is certified that error appears in the above-identified patent and that said Letters Patent is hereby corrected as shown below:

In the Claims

Column 33, Claim 15, Line 37 should read: receive the one or more second commands Signed and Sealed this
Fourteenth Day of May, 2024

Katherine Kelly Vidal
*Director of the United States Patent and Trademark Office*